(12) United States Patent  (10) Patent No.: US 6,711,298 B1
Amonou  (45) Date of Patent: Mar. 23, 2004

(54) DIGITAL SIGNAL CODING, DECODING AND TRANSMISSION, WITH DECOMPOSITION INTO FREQUENCY SUB-BANDS AND SEGMENTATION

(75) Inventor: Isabelle Amonou, Thorigne-Fouillard (FR)

(73) Assignee: Canon Research Centre France S.A. (FR)

( * ) Notice: Subject to any disclaimer, the term of this patent is extended or adjusted under 35 U.S.C. 154(b) by 484 days.

(21) Appl. No.: 09/593,695

(22) Filed: Jun. 15, 2000

(30) Foreign Application Priority Data

Jun. 15, 1999 (FR) .............................. 99 07585
Nov. 26, 1999 (FR) .............................. 99 14922

(51) Int. Cl.⁷ ................................ G06K 9/36
(52) U.S. Cl. .................................... 382/240
(58) Field of Search ................. 382/232, 236, 382/238, 240, 242, 250; 348/384.1, 394.1–395.1, 400.1–404.1, 407.1–416.1, 420.1–421.1, 425.2, 430.1–431.1; 375/240.02–240.03, 240.11–240.16, 240.18–240.2, 240.22–240.25; 341/51, 63, 65, 67, 79, 107; 708/203, 300, 307–308, 313, 316–317, 400–405

(56) References Cited

U.S. PATENT DOCUMENTS

| | | | | |
|---|---|---|---|---|
| 5,896,176 A | * | 4/1999 | Das et al. ................. | 348/416.1 |
| 5,898,798 A | * | 4/1999 | Bouchard et al. ........... | 382/242 |
| 5,995,668 A | * | 11/1999 | Corset et al. ............... | 382/233 |
| 6,026,183 A | * | 2/2000 | Talluri et al. ............... | 382/194 |
| 6,173,069 B1 | * | 1/2001 | Daly et al. .................. | 382/118 |
| 6,272,253 B1 | * | 8/2001 | Bannon et al. ............. | 382/236 |
| 6,289,297 B1 | * | 9/2001 | Bahl .............................. | 703/2 |
| 6,519,004 B1 | * | 2/2003 | Bahl ....................... | 348/385.1 |

FOREIGN PATENT DOCUMENTS

| | | |
|---|---|---|
| EP | 0 820 197 | 1/1998 |
| EP | 0 909 096 | 4/1999 |
| FR | 2 788 401 | 7/2000 |
| WO | 97 15145 | 4/1997 |
| WO | WO 97/15145 | 4/1997 |
| WO | 97 16030 | 5/1997 |
| WO | WO 97/16030 | 5/1997 |

OTHER PUBLICATIONS

Calvagno, G. et al., "Low Bit Rate Video Coding Based On Generalized Prediction Of The Pyramid Subband Decomposition" Proceedings Of The International Conference On Image Processing (ICIP), US, Los Alamito, IEEE Comp. Soc. Press, Oct. 23, 1995, pp. 422–425 XP000623997 ISBN: 0–7803–3122–1 *le document en entier*.

(List continued on next page.)

Primary Examiner—Jose L. Couso
(74) Attorney, Agent, or Firm—Fitzpatrick, Cella, Harper & Scinto

(57) ABSTRACT

The invention concerns a method of coding a set of data (IM) representing physical quantities, characterized in that it includes the steps of:

Figure 1:
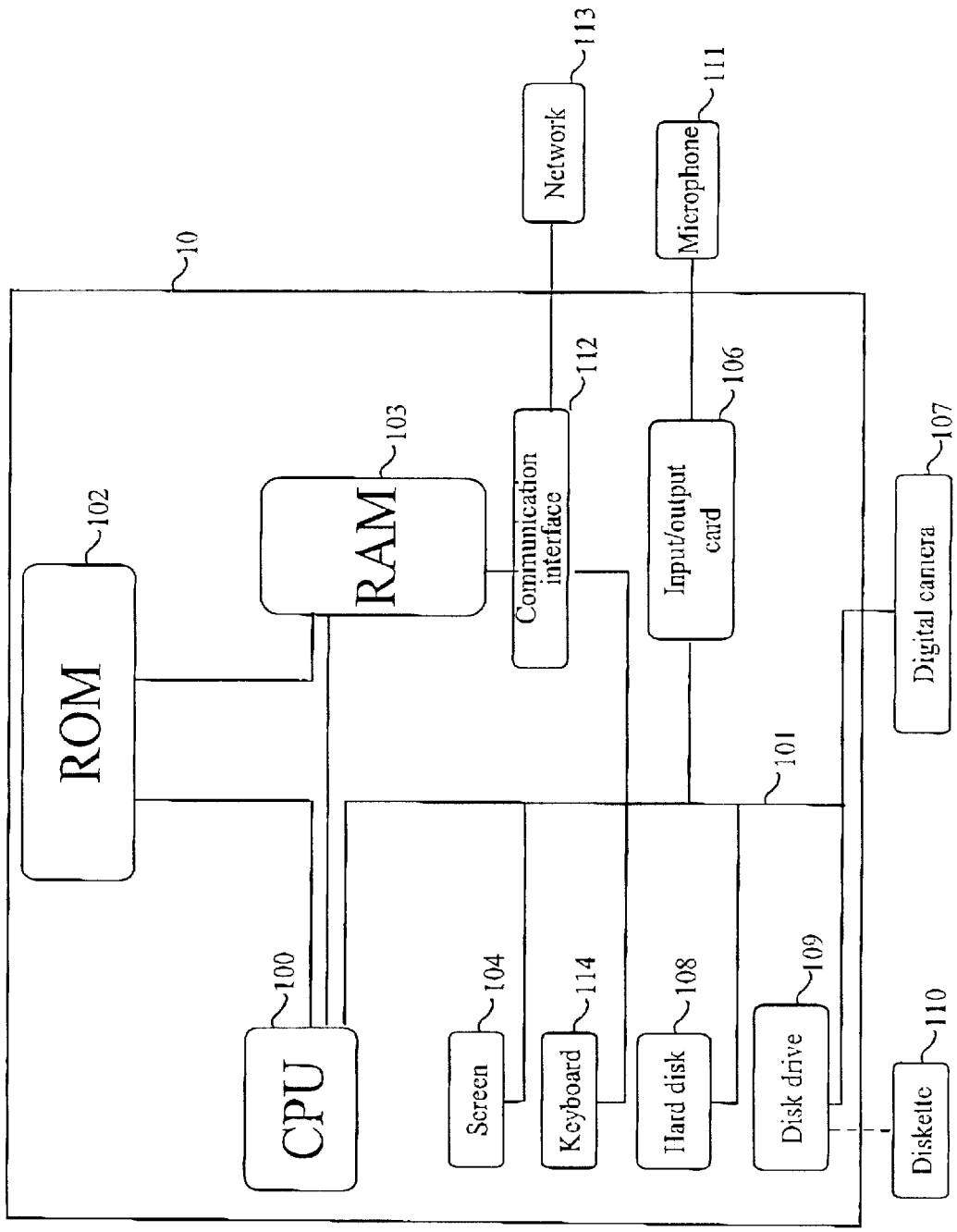

decomposing (E20) the set of data into a plurality of frequency sub-bands on at least one resolution level, then, for each resolution level, segmenting (E23, E26) at least one sub-band into at least two homogeneous regions, in order to form a segmentation map, ordering (E30, E33) the regions according to a predetermined criterion, coding (E21) the sub-bands of the resolution level under consideration, ordering (E31, E34) the coding data of the sub-bands as a function of the order of the regions.

41 Claims, 15 Drawing Sheets

OTHER PUBLICATIONS

Casas, J.R. et al., "A Region–Based Subband Coding Scheme" Signal Processing. Image Communication, NL, Elesvier Science Publishers, Amsterdam, vol. 10, No. 1/03, juillet 1997 (Jul. 1997), pp. 173–200 XP000691765, ISSN: 0923–5965, * sections 2.2, 3.1, 4.1, 6.* * figures 4,6*.

Oehler, K.L., "Region–Based Wavelet Compression For Very Low Bitrate Video Coding" Proceedings Of The International Conference On Image Processing (ICIP), US, New York, IEEE, 16 septembre 1996 (Sep. 16, 1996), pp. 573–576 XP000733306, ISBN: 0–7803–3259–8* le document en entier*.

G. Calvagno et al., "Low Bit Rate Video Coding Based On Generalized Prediction Of The Pyramid Subband Decomposition", Proc. Of the Int'l Conf. On Image Proc., Oct. 23, 1995, pp. 422–425.

J. Casas et al., "A Region–Based Subband Coding Scheme", Signal Proc. Image Communication, vol. 10, No. 1/03, Jul. 1997, pp. 173–200.

C. Lu et al., "Unsurpervised Texture Segmentation Via Wavelet Transform", Pattern Recognition, vol. 30, No. 5, May 1997, pp. 792–742.

E. Salari et al., "Texture Segmentation Using Hierarchical Wavelet Decomposition", Pattern Recognition, vol. 28, No. 12, Dec. 1995, pp. 1819–1824.

K. Oehler, "Region–Based Wavelet Compression For Very Low Bitrate Video Coding", Proc. Of the Int'l Conf. On Image Proc., Sep. 16, 1996, pp. 573–576.

* cited by examiner

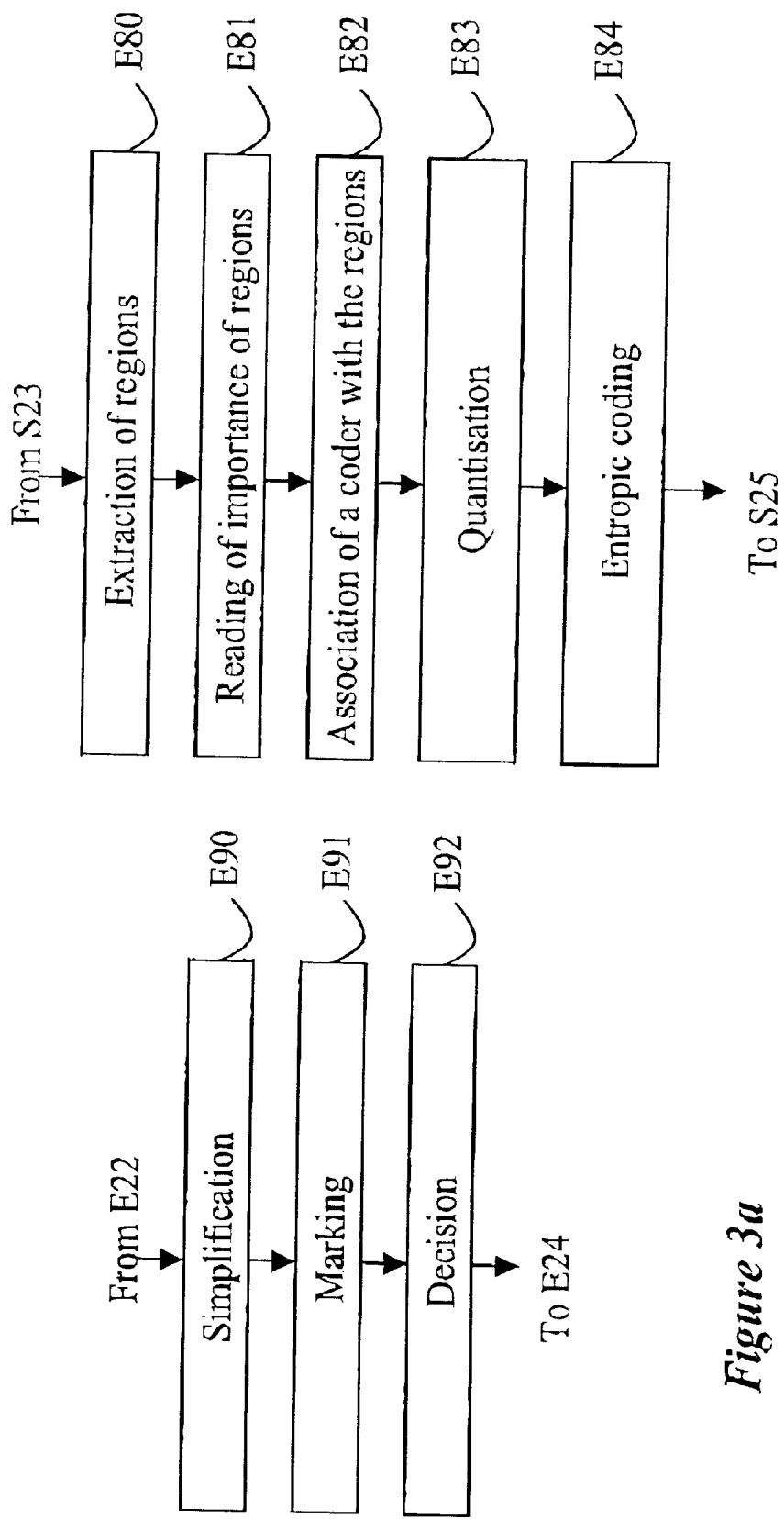

DIGITAL SIGNAL CODING, DECODING AND TRANSMISSION, WITH DECOMPOSITION INTO FREQUENCY SUB-BANDS AND SEGMENTATION

The present invention concerns, in general terms, digital signal coding and proposes to this end a device and method for coding a digital signal by decomposition into frequency sub-bands of the signal, and segmentation of certain frequency sub-bands. It also concerns the transmission of the coded signal and also a decoding method and device corresponding to the coding device and method.

The purpose of coding is to compress the signal, thus making it possible to transmit the digital signal or to store it by reducing the quantity of binary symbols necessary for representing it. The coding can be without loss, that is to say it keeps all the information contained in the digital signal, or on the other hand with loss, that is to say some information contained in the digital signal may be degraded.

The present invention is applicable in each of the above two types of digital signal coding. Hereinafter, the coding of digital images or video sequences will be dealt with more particularly. A video sequence is defined as a succession of digital images. It is particularly adapted to the storage of images in data bases and to their transmission over a network to a number of distant items of equipment.

It is known that a digital signal can be decomposed into frequency sub-bands before compressing it. Decomposition consists of creating, from the digital signal, a set of sub-bands each containing a limited frequency spectrum. The sub-bands can be of different resolutions, the resolution of a sub-band being the number of samples per unit length used for representing this sub-band. In the case of a digital image signal, a frequency sub-band of this signal can be considered to be an image, that is to say a bidimensional table of digital values.

It should be noted that the decomposition of a signal into frequency sub-bands creates no compression in itself, but makes it possible to decorrelate the signal so as to eliminate the redundancy existing in the digital image prior to the compression proper. The sub-bands are then compressed more effectively than the original signal.

Conventionally, the coding of a digital signal, in this case of a digital image, includes three steps. The image is first of all decomposed by a transformation into frequency sub-bands, the coefficients thereof are quantised as indices and finally these indices are coded by means of an entropic coding without loss.

This type of compression makes it possible to obtain a relatively high degree of compression of the signal but does not make it possible to access the content of the image. In other words, the decomposition of the signal remains purely of the frequency type, and gives no information about the objects which may be contained in the image. Object means an entity of the image corresponding to a semantic unit, for example the face of a person. An object can comprises one or several regions of the image. In the following, notions of object and region will be considered as equivalent.

Coding using a decomposition into sub-bands of the signal is by nature progressive by sub-band, and therefore allows transmission of the coded data which is progressive by sub-band.

There also exist other image compression techniques based on the segmentation thereof. In this context, the image is considered to consist of objects with two dimensions. Segmentation is a low-level process whose purpose is to effect a partitioning of the image into a certain number of subelements referred to as regions. The partitioning is such that the regions are separate and combining them forms the image. The regions correspond or do not correspond to objects in the image, the term object referring to an item of information of a semantic nature. Very often, however, an object corresponds to a region or set of regions. Each region can be represented by an item of information representing its shape, colour or texture.

Conventionally, a method of compressing a digital image based on a segmentation includes a first so-called marking step, that is to say the interior of the regions having local homogeneity is extracted from the image. Next, a decision step precisely defines the contours of the areas containing homogeneous data At the end of this step, each pixel of the image is associated with a label identifying the region to which it belongs. The set of all the labels of all the pixels is conventionally referred to as a segmentation map. Finally, in such a coding, the last step consists of coding the segmentation map, generally in the form of contours of the regions, and pertinent parameters representing the interior of the regions, such as the texture and the colour.

This type of technique makes it possible, for a given image, to obtain a higher degree of compression than with the technique previously described. This is because, with segmentation, the compression can be effected selectively on the object or regions judged to be the most important, to the detriment of the others. Thus, for a given degree of compression, that is to say for a number of binary elements allowed, a precise object (typically the face of a person in an image of the "head and shoulders") type, can be coded precisely using a maximum number of bits, to the detriment of the background, which for its part will be coded with a minimum number of bits.

Segmentation allows progressive coding by regions, and consequently transmission of the coded data which is progressive by regions.

This type of technique, however, does not make it possible to have multiresolution information as permitted by the methods with decomposition into sub-bands.

Other techniques combine the two compression methods described above, such as for example the standard known as MPEG4 (from "Motion Picture Expert Group"), which is currently being converted into an 30 ISO/IEC standard. In the MPEG4 coder, more particularly in the case of the coding of fixed images, the decomposition of the image into frequency sub-bands is used conjointly with a segmentation of the image. A step prior to the coder (not standardised) is responsible for isolating the objects in the image (Video objects) and representing each of these objects by a mask. In the case of a binary mask, the spatial support of the mask has the same size as the original image and a point on the mask at the value 1 (or respectively 0) indicates that the pixel at the same position in the image belongs to the object (or respectively is outside the object).

For each object, the mask is then transmitted to a shape decoder whilst the texture for each object is decomposed into sub-bands, and the sub-bands are next transmitted to a texture decoder.

This method has a certain number of drawbacks. This is because it is necessary to code the mask for each object at its highest resolution level (in Version 1 of MPEG4) or in certain cases at two resolution levels (Version 2 of MPEG4). For a given degree of compression, this impairs the quality of the reconstructed image, since it is necessary to reserve output for the masks of the objects, which are at a high resolution. Moreover, the number of objects handled is a priori the same at all levels, whilst it may be more advantageous to have a number of objects increasing with the (spatial) resolution, that is to say a true conjoint scalability between the resolution and the number of objects.

The present invention aims to remedy the drawbacks of the prior art, by providing a method and device for compressing a digital signal which offer a high compression ratio whilst allowing progressive transmission of the content of the image, both in resolution and by objects.

To this end, the invention proposes a method of coding a set of data representing physical quantities, characterised in that it includes the steps of:

decomposing the set of data into a plurality of frequency sub-bands on at least one resolution level, coding the sub-bands, then, for each resolution level, segmenting at least one sub-band into at least two homogeneous regions, in order to form a segmentation map, ordering the regions according to a predetermined criterion, ordering the coding data of the sub-bands as a function of the order of the regions.

Correlatively, the invention concerns a device for coding a set of data representing physical quantities, characterised in that it has:

means of decomposing the set of data into a plurality of frequency sub-bands on at least one resolution level, means of coding the sub-bands, means of segmenting, for each resolution level, at least one sub-band into at least two homogeneous regions, in order to form a segmentation map, means of ordering the regions according to a predetermined criterion, means of ordering the coding data of the sub-bands as a function of the order of the regions.

By virtue of the invention, the compression ratio is high. This is because the decomposition into sub-bands makes it possible to decorrelate the signal, and the segmentation on a particular sub-band is thus more effective. In addition, it is possible to effect a progressive transmission on the content of the image, both in resolution and by object.

According to a preferred characteristic, the invention includes the coding of the segmentation map of at least one resolution level, preferably the lowest resolution level in the decomposition.

This coded segmentation map is attached to the coded data, and is then used at the time of decoding for ordering the data.

According to a preferred characteristic, the sub-bands are coded and then decoded prior to segmentation. In the case of coding with loss, the coding and subsequent decoding are effected on the same data. Thus, the segmentation is performed on the same data and the results are identical on coding and on decoding.

According to another preferred characteristic, the segmentation is effected on the sub-band with the lowest frequency of the resolution level under consideration. This sub-band contains more information than the other sub-bands and allows more pertinent segmentation of the data. The segmentation map is smaller compared with a full-resolution segmentation. It is consequently faster to determine, and requires a reduced transmission rate if it is to be transmitted.

According to a preferred characteristic, the scheduling criterion depends on an analysis of the segmentation. Thus the regions are ordered according to their importance.

According to a preferred characteristic, the invention also includes the transmission of the segmentation map determined at the lowest resolution level and the coding data of all the sub-bands, for all the resolution levels.

This is because, according to the invention, only the segmentation map of the lowest resolution level must be transmitted, whilst the other segmentation maps, necessary for the higher resolution levels if such exist, are calculated at the time of decoding.

The invention also concerns a method of decoding data representing physical quantities coded by the coding method according to the invention, characterised in that, for a given resolution level, it includes the steps of:

analysis of the segmentation in order to classify the regions according to a predetermined criterion, decoding the coding data of the sub-bands of the resolution level under consideration as a function of the result of the previous step, reconstructing the sub-bands, synthesising the reconstructed sub-bands.

The invention also concerns a decoding device having means of implementing the above characteristics.

The decoding method and device make it possible to reconstruct the signal, for example in a receiving apparatus corresponding to a transmitting apparatus in which the signal was coded according to the invention.

Additionally, the invention allows a selective coding by object. To this end, the invention proposes a method of coding a set of data representing physical quantities, characterised in that it includes the steps of:

decomposing the set of data into a plurality of frequency sub-bands on at least two resolution levels, then, for at least one resolution level, segmenting at least one sub-band of the resolution level under consideration into at least two homogeneous regions, ordering the regions according to a predetermined criterion, coding by region the coefficients of the resolution level under consideration, and, for at least one resolution level, except the highest resolution level, decoding the coded coefficients of the resolution level under consideration, in order to form decoded sub-bands, and synthesising the decoded sub-bands of the resolution level under consideration, on one resolution level, in a synthesised sub-band which will be considered at the following iteration.

Thus, the invention allows a selective coding by object. The quality is higher for some selected objects, and lower for some other objects, for a given "global" bit rate.

The invention also concerns a method for transmitting a set of data representing physical quantities, comprising the above coding method, and comprising the transmission of the coded coefficients.

The invention also proposes a device comprising means for implementing the above features.

The invention also concerns a digital apparatus including the coding or transmitting, respectively decoding, device, or means of implementing the coding or transmitting, respectively decoding, method. The advantages of the device and of the digital apparatus are identical to those disclosed above.

An information storage means, which can be read by a computer or microprocessor, integrated or not into the device, possibly removable, stores a program implementing the coding, or respectively decoding, method.

Figure 2:
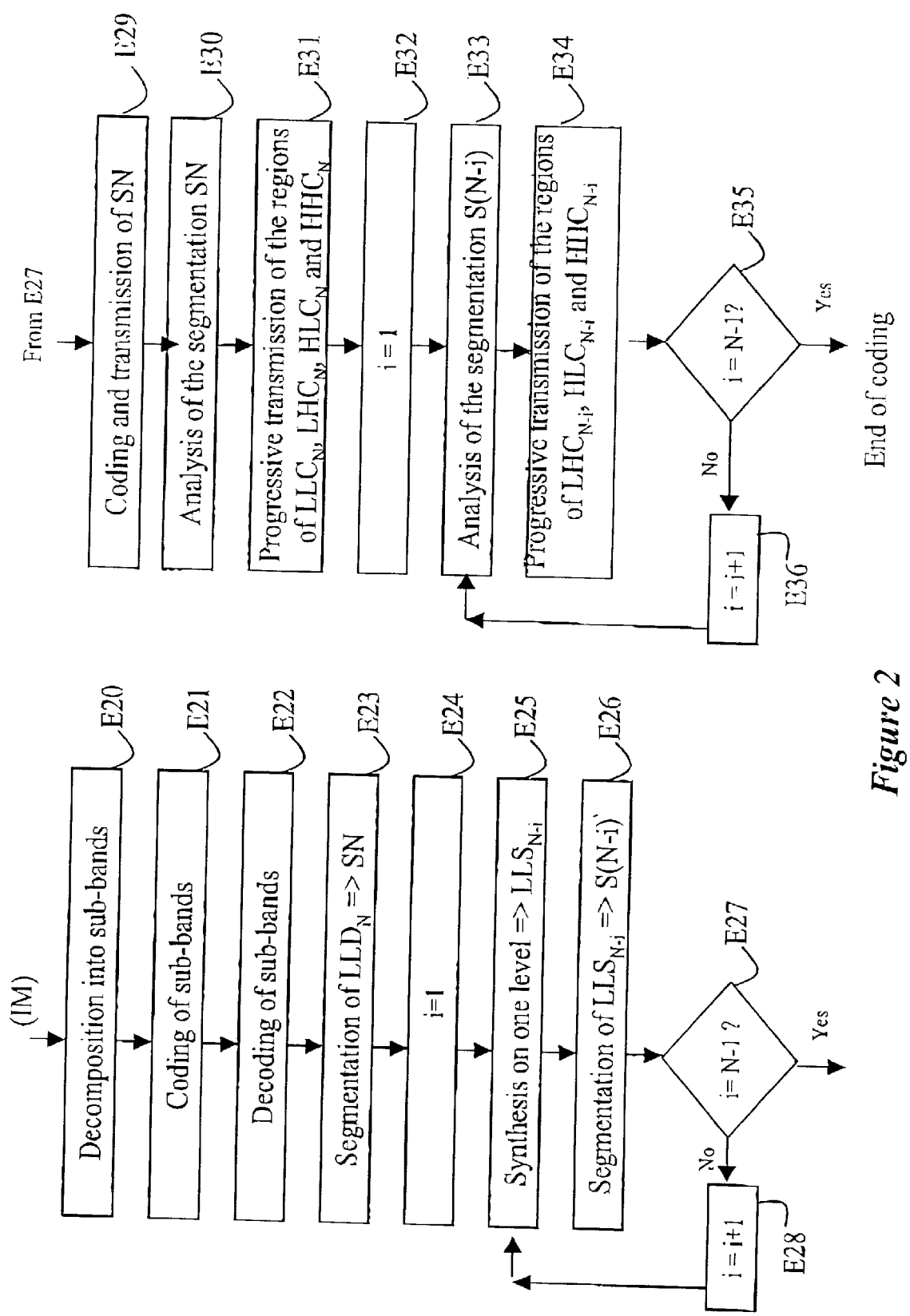
Figure 2A:
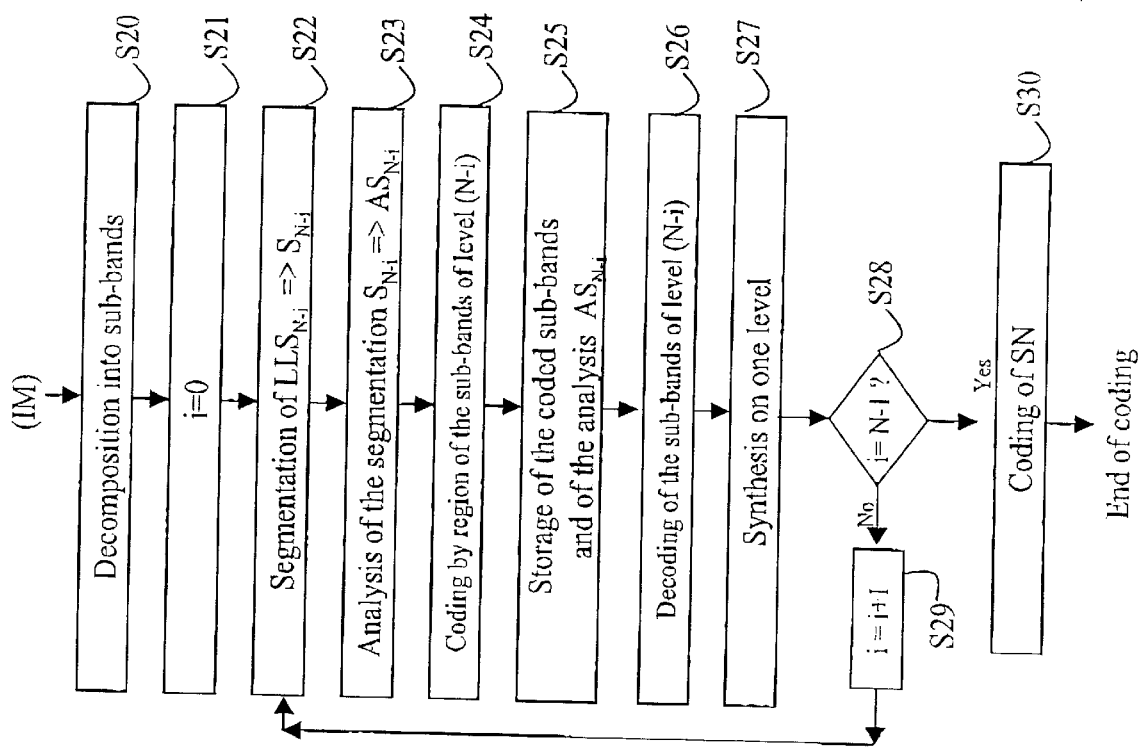
Figure 2B:
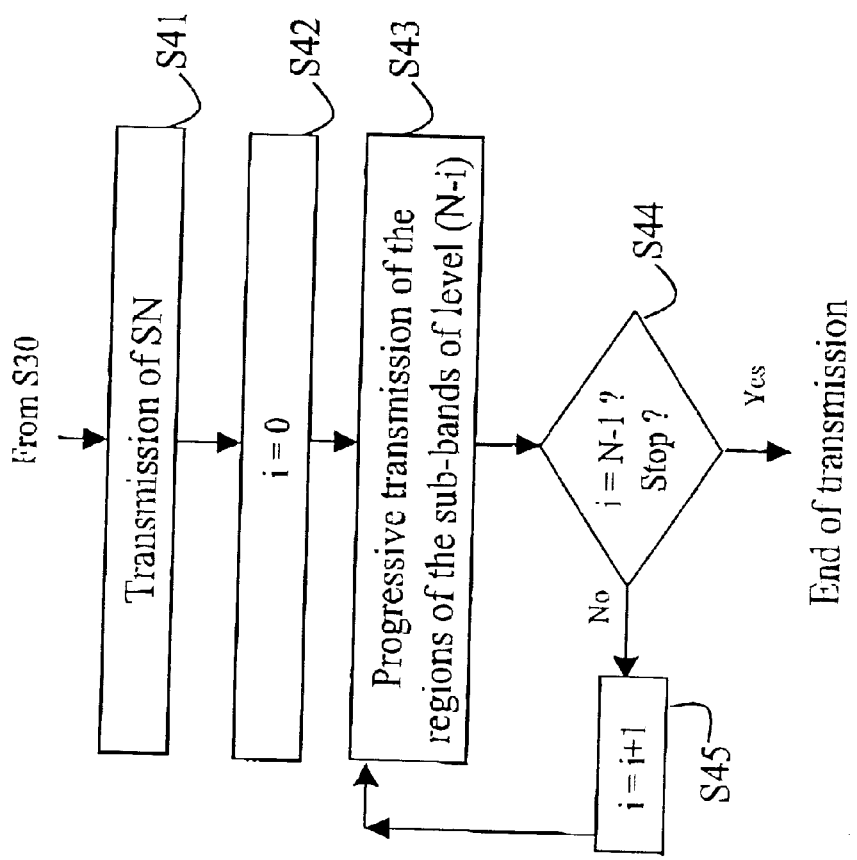
Figure 4:
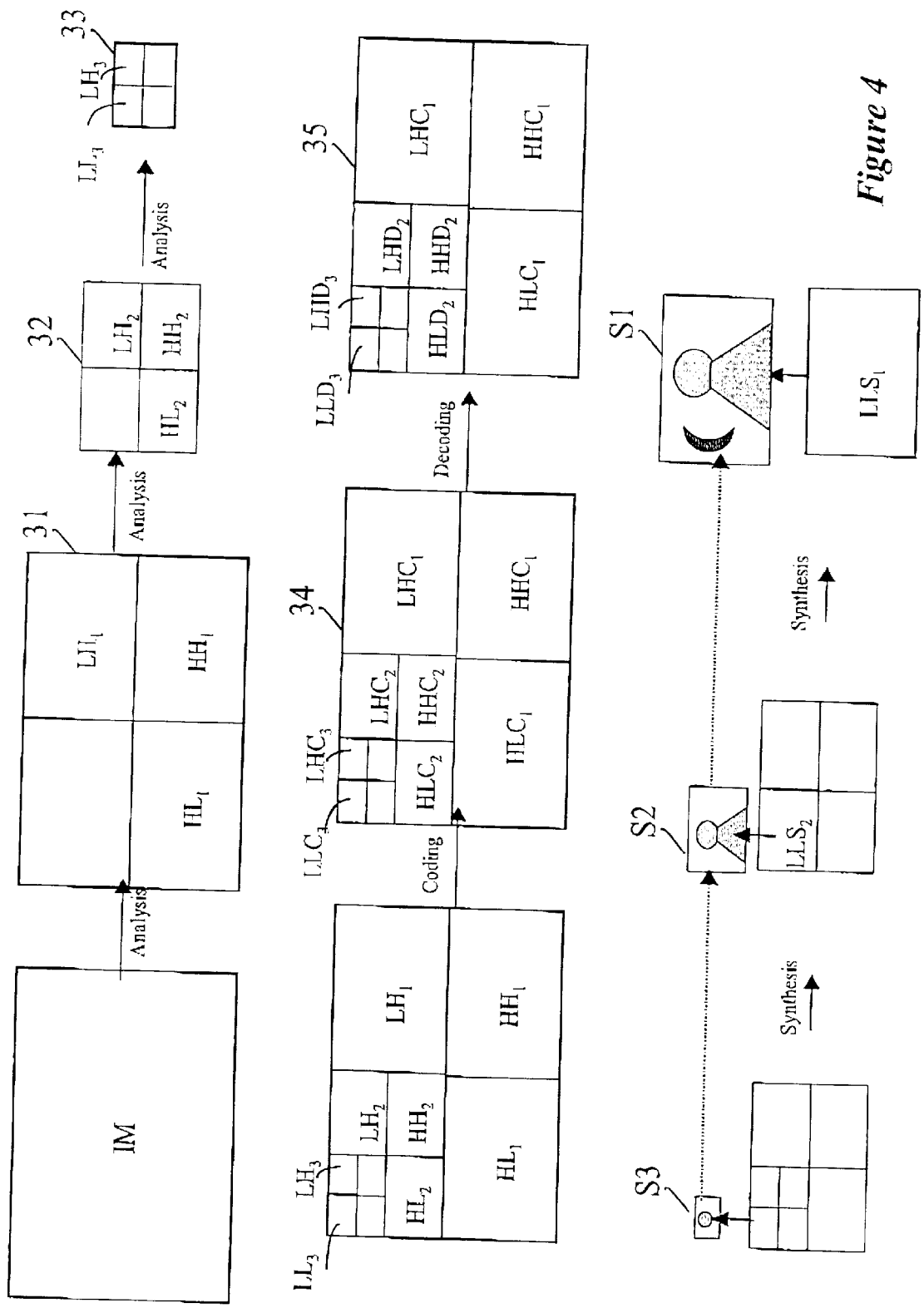
Figure 4A:
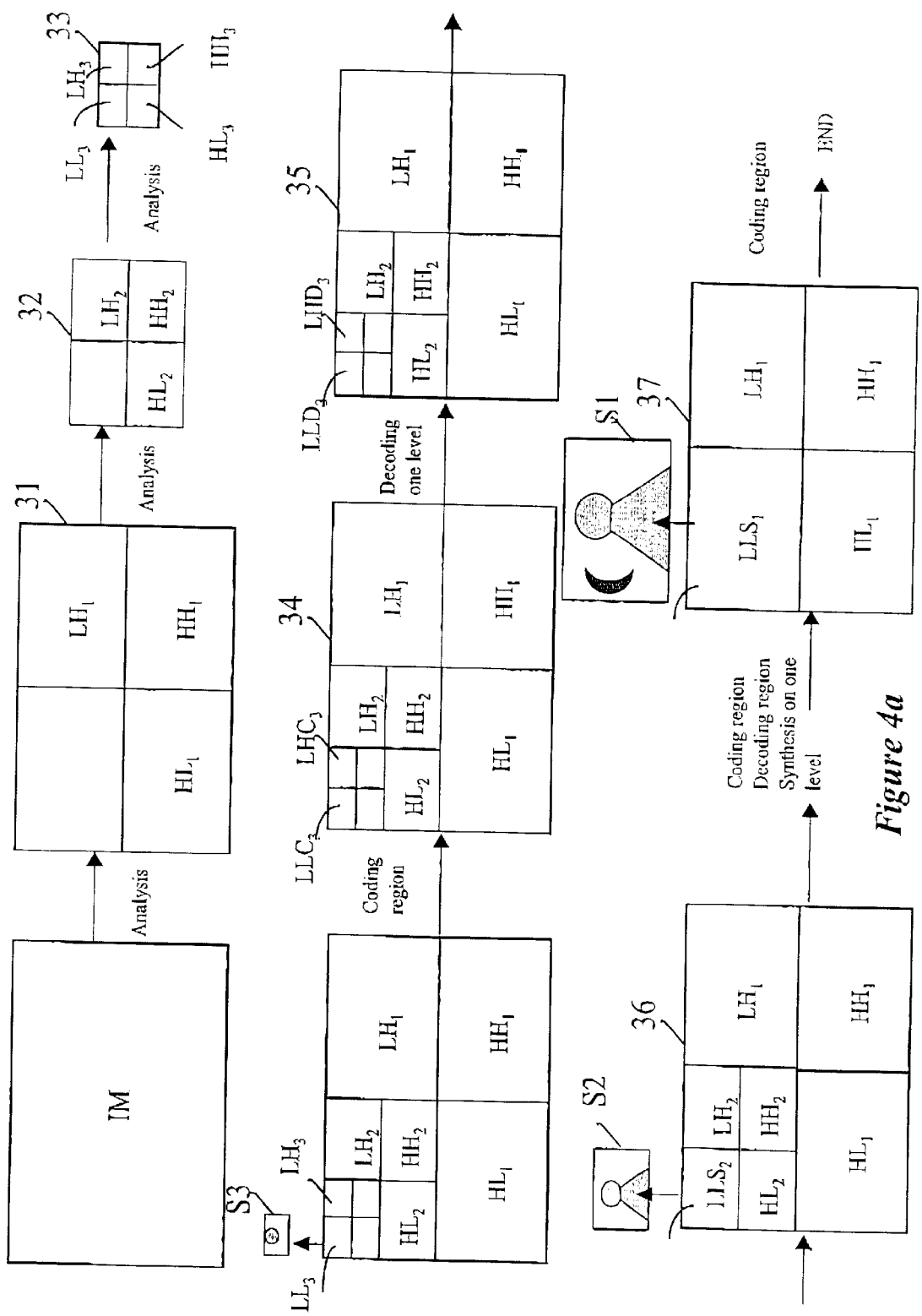
Figure 4B:
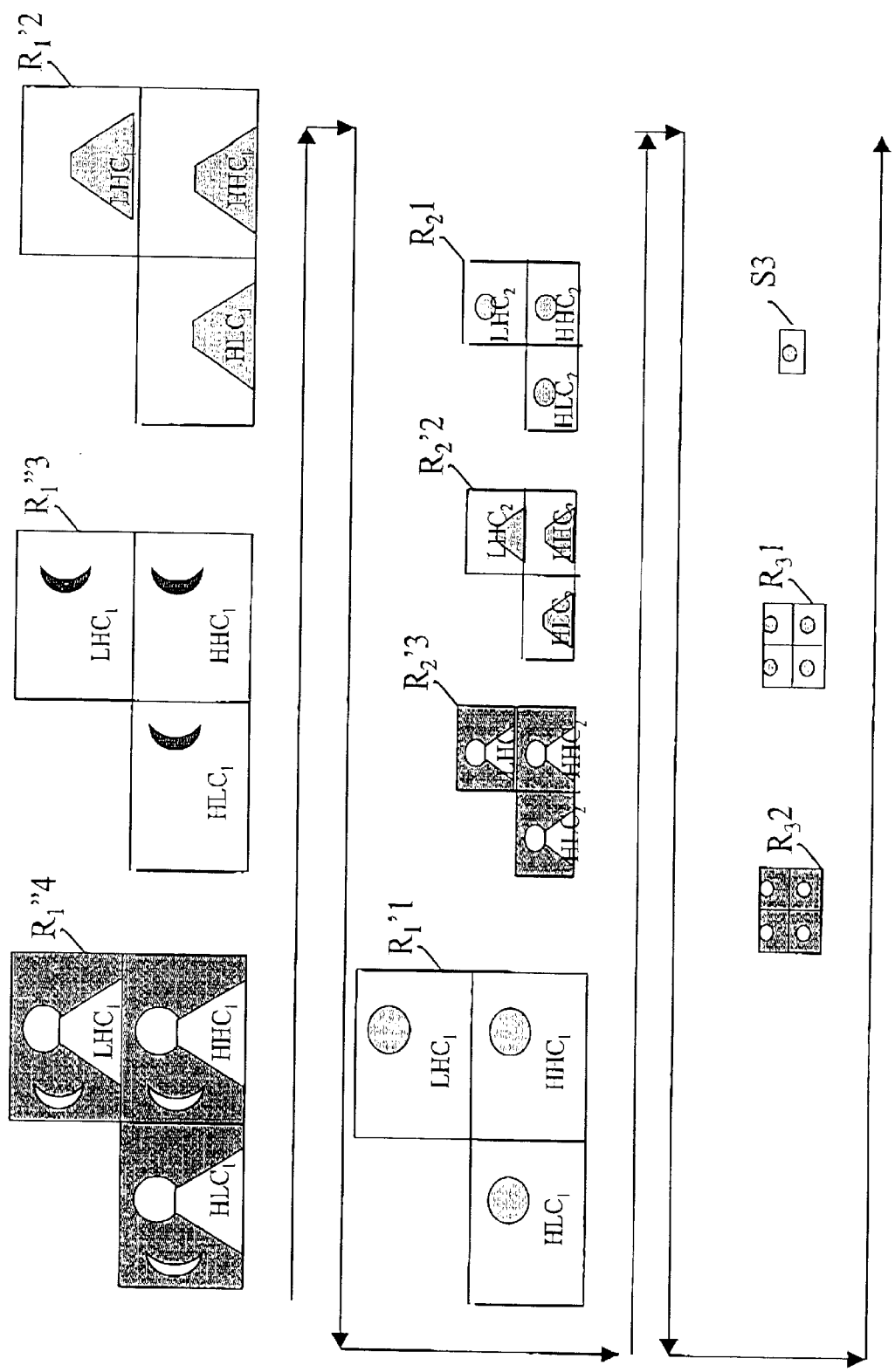
Figure 5:
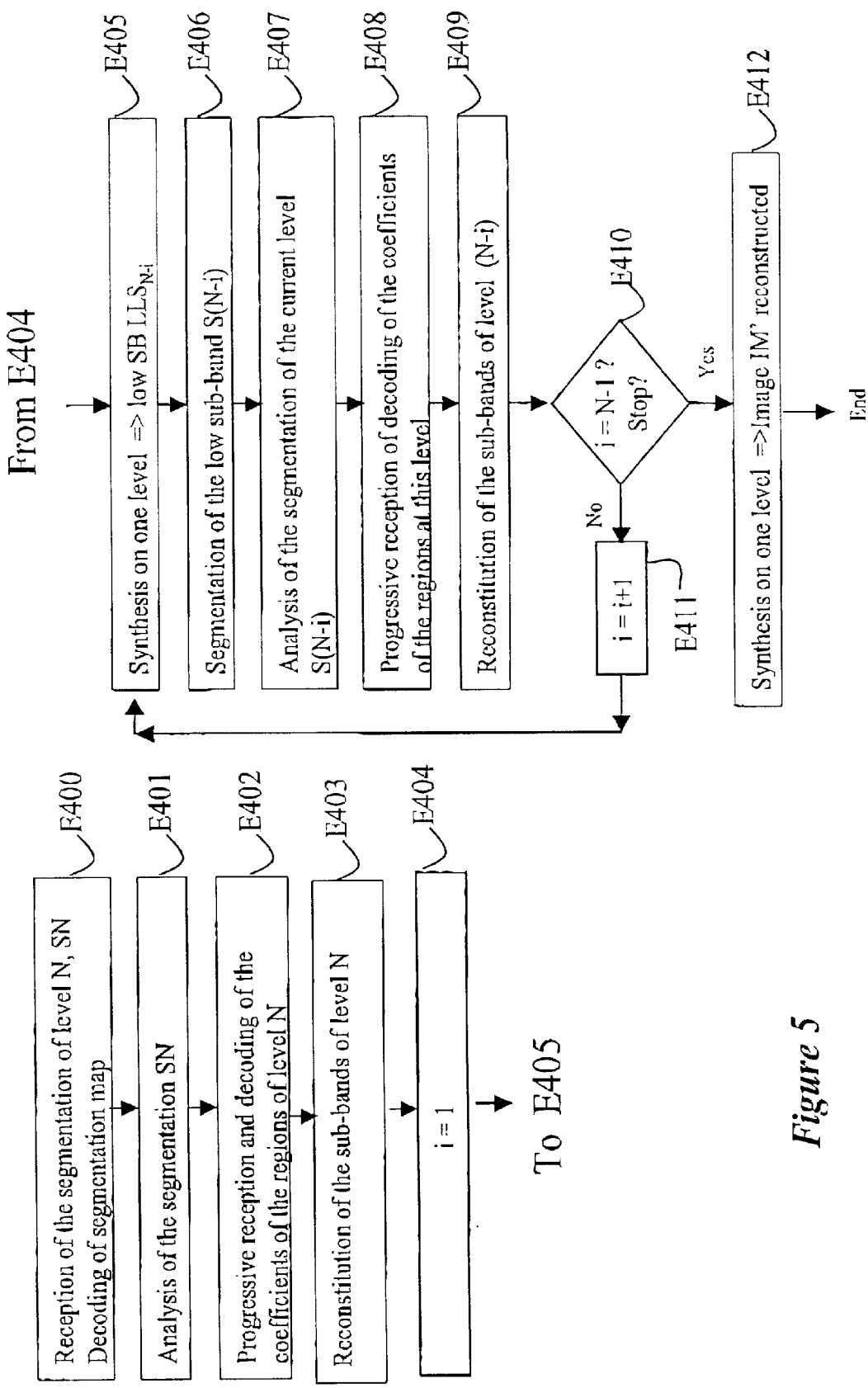
Figure 6:
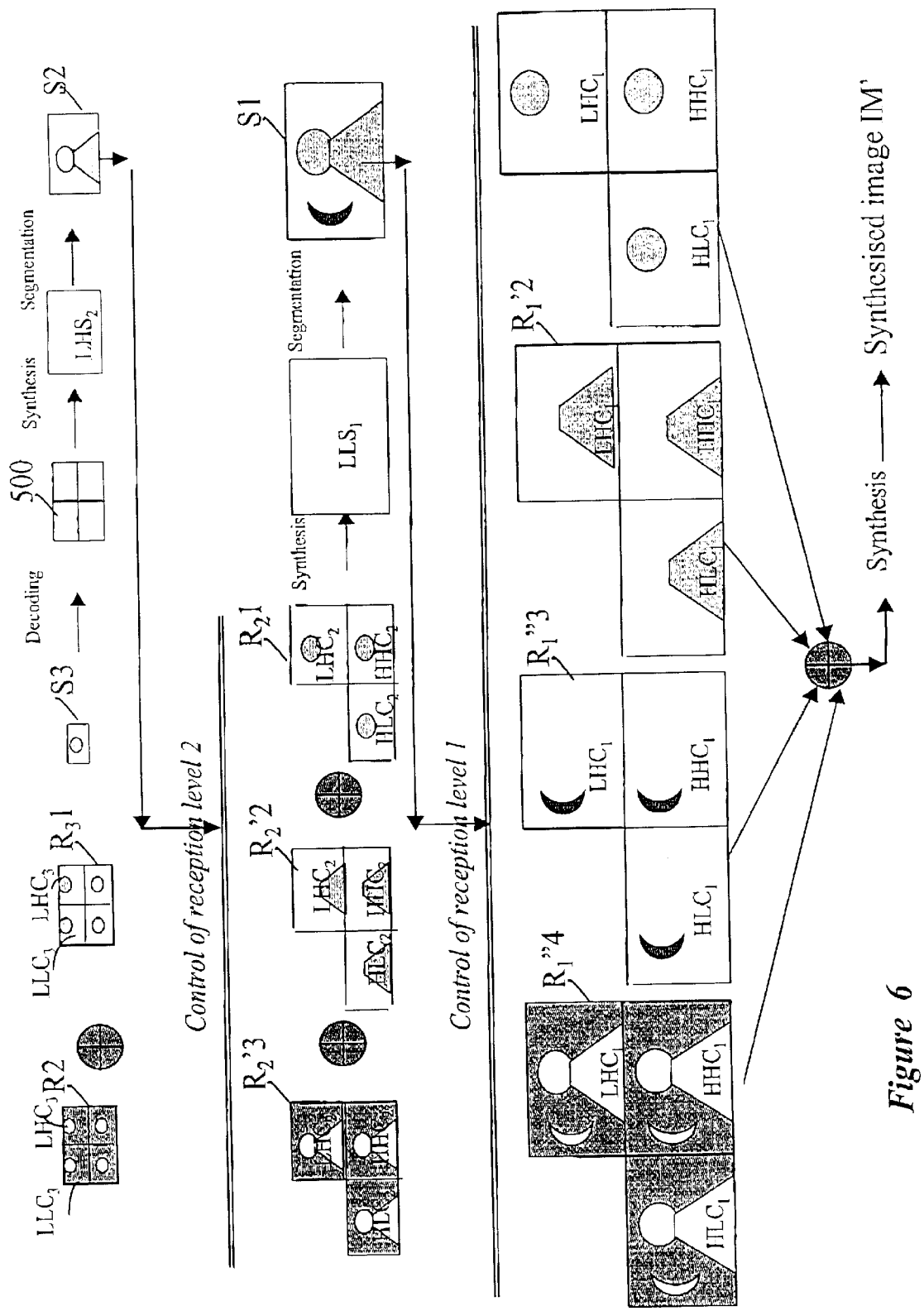
Figure 7:
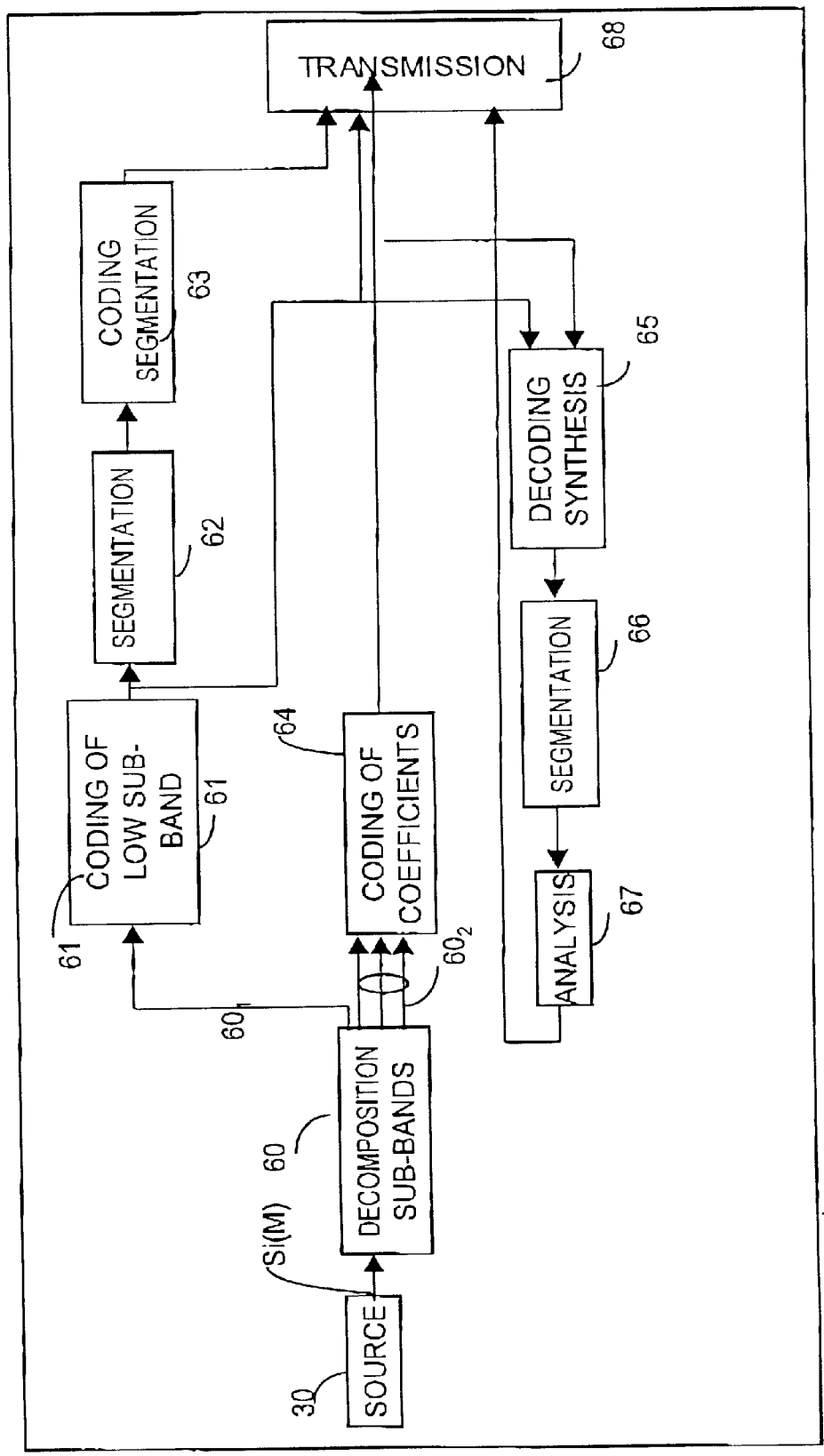
Figure 7A:
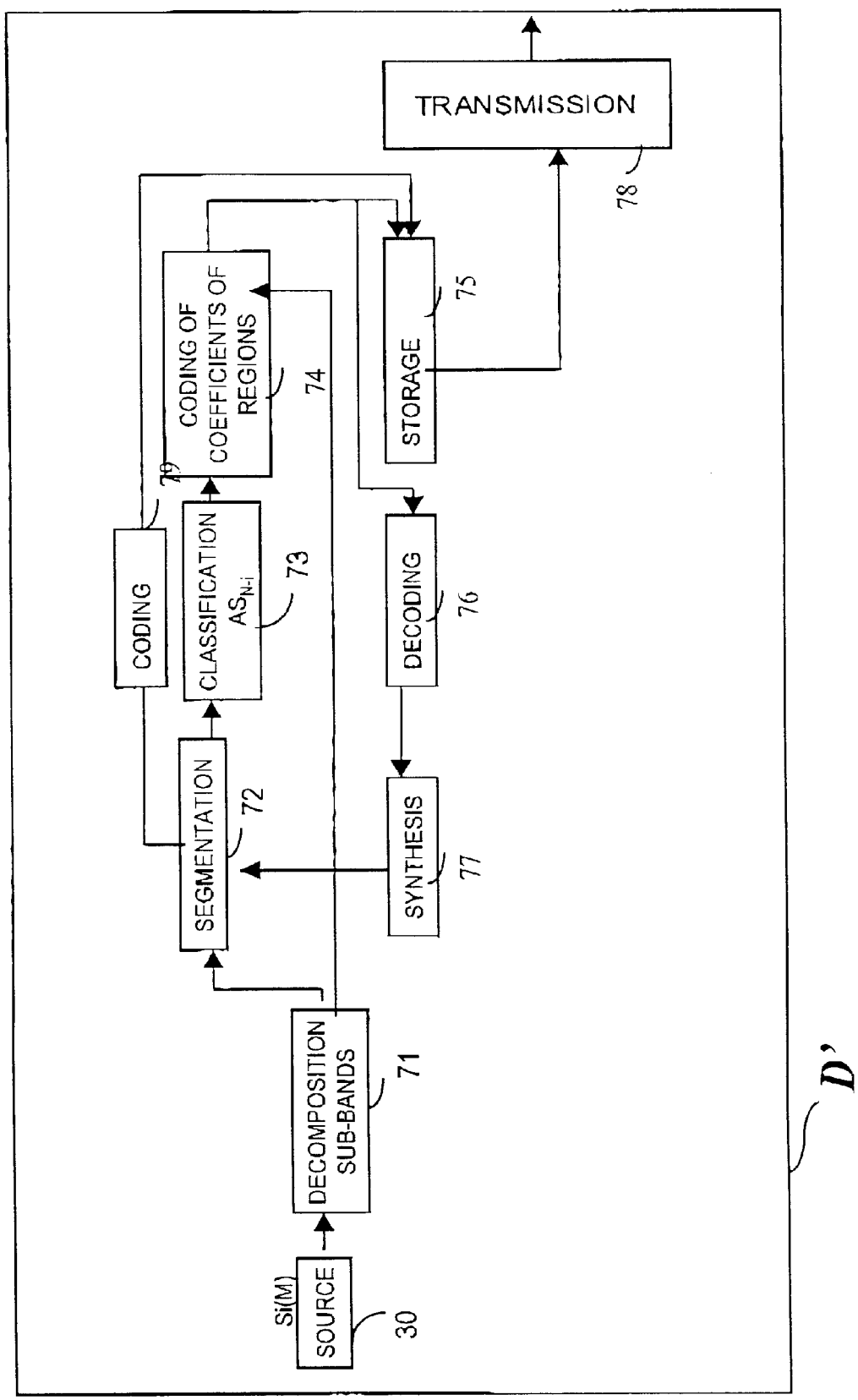
Figure 8:
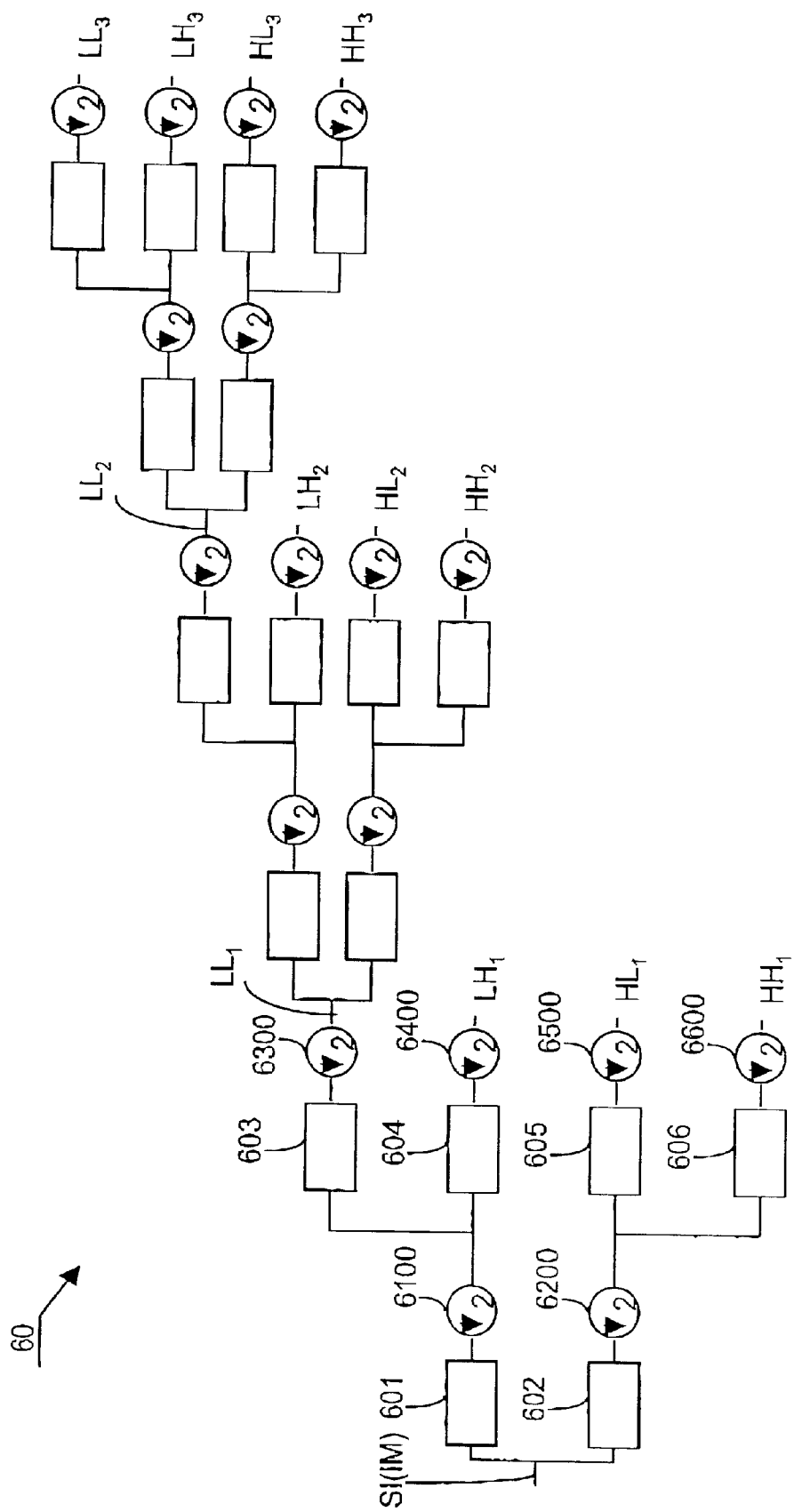
Figure 10:
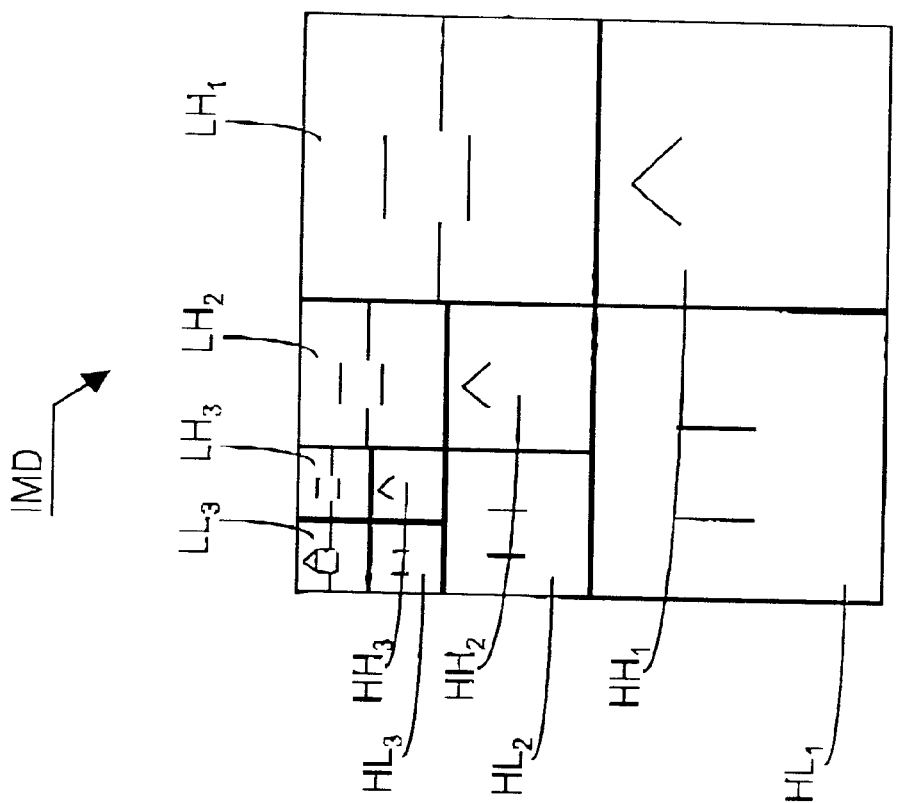
Figure 9:
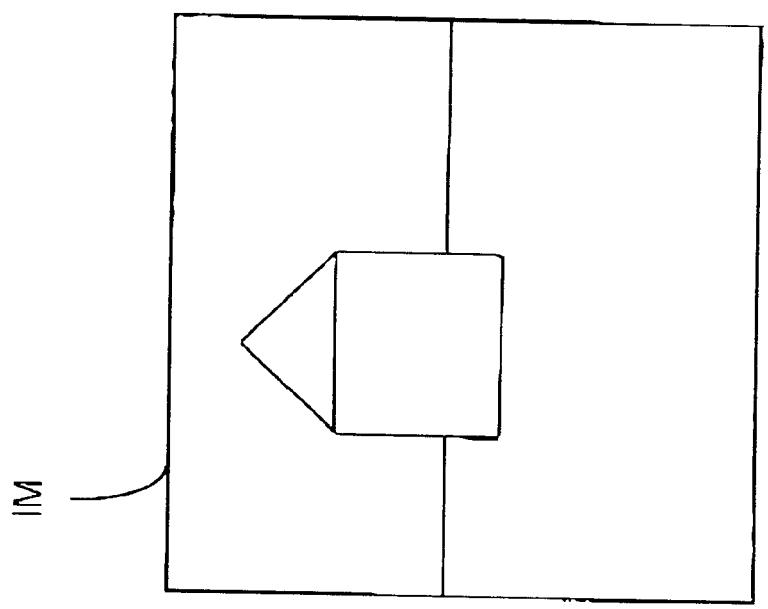
Figure 11:
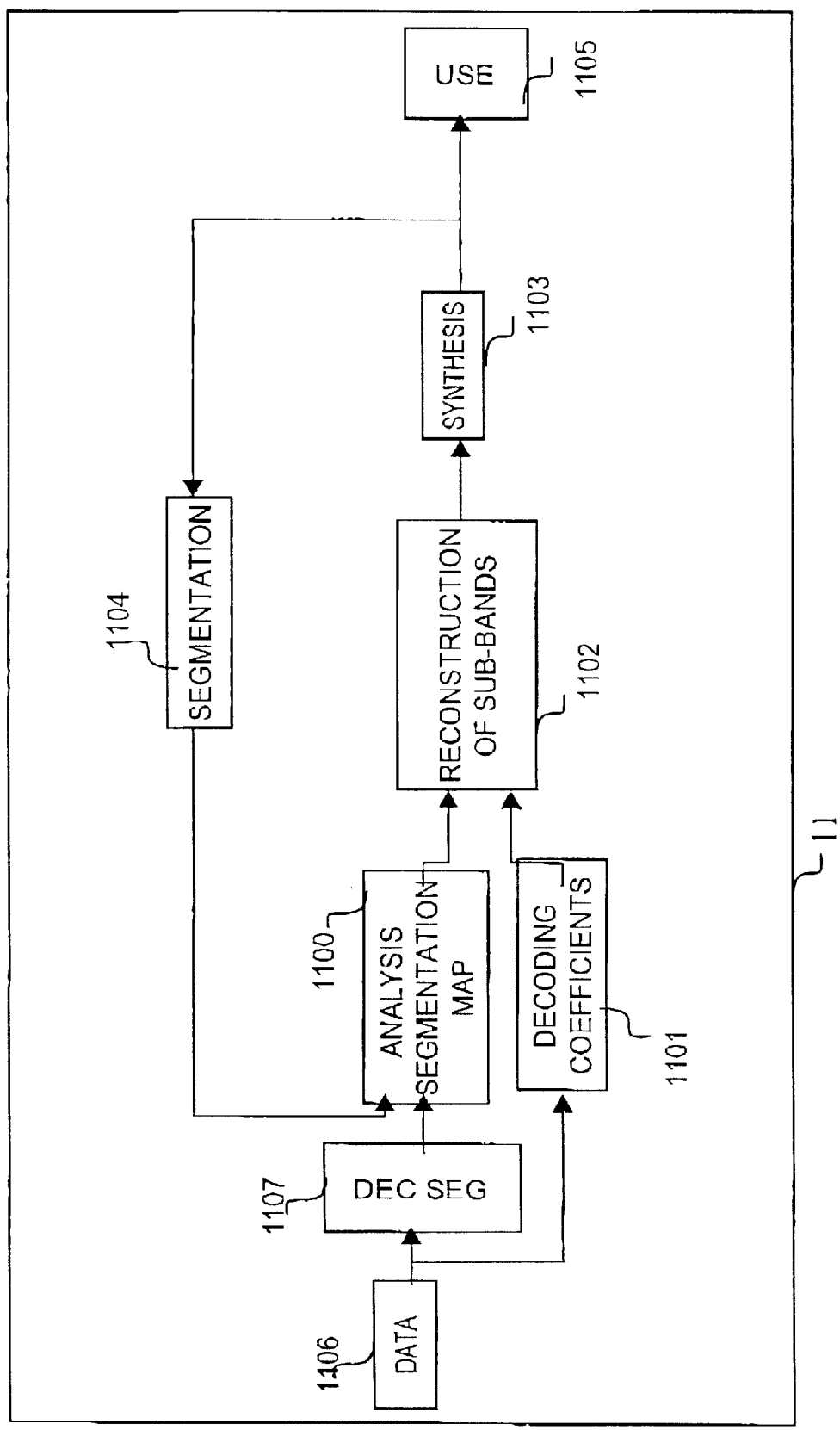

The characteristics and advantages of the present invention will emerge more clearly from a reading of a preferred embodiment illustrated by the accompanying drawings, in which:

FIG. 1 is an embodiment of a device implementing the invention,

FIG. 2 depicts a coding algorithm according to a first embodiment of the present invention, FIG. 2a depicts a coding algorithm according to a second embodiment of the present invention, FIG. 2b depicts a transmission algorithm according to the second embodiment of the present invention, FIG. 3a is an algorithm implementing the segmentation step included in the coding algorithm of FIG. 2, FIG. 3b is an algorithm implementing a coding step included in the coding algorithm of FIG. 2a, FIG. 4 is a diagram showing the coding steps according to the first embodiment of the present invention, FIG. 4a is a diagram showing the coding steps according to the second embodiment of the present invention, FIG. 4b is a diagram showing the binary flow at the coder output, FIG. 5 depicts a decoding algorithm according to the present invention, FIG. 6 is a diagram showing the coding steps according to the present invention, FIG. 7 is an embodiment of a digital signal coding device according to the first embodiment of the present invention, FIG. 7a is an embodiment of a digital signal coding device according to the second embodiment of the present invention, FIG. 8 is a circuit for decomposition into frequency sub-bands included in the device of FIG. 7, FIG. 9 is a digital image to be coded by the coding device according to the present invention, FIG. 10 is an image decomposed into sub-bands by the circuit of FIG. 8, FIG. 11 is an embodiment of a digital signal decoding device according to the present invention.

According to the embodiment chosen and depicted in FIG. 1, a device implementing the invention is for example a microcomputer 10 connected to different peripherals, for example a digital camera 107 (or a scanner, or any means of acquiring or storing an image) connected to a graphics card and supplying information to be compressed according to the invention.

The device 10 has a communication interface 112 connected to a network 113 able to transmit digital data to be compressed or to progressively transmit data compressed by the device. The device 10 also has a storage means 108 such as, for example, a hard disk. It also has a disk drive 109. The disk 110 can be a diskette, a CD-ROM, a DVD-ROM, a memory card, for example. More generally, an information storage means, which can be read by a computer or microprocessor, integrated or not into the device, possibly removable, stores a program implementing the coding, transmitting or respectively decoding, method.

The disk 110, as the disk 108, can contain data compressed according to the invention as well as the program(s) implementing the invention which, once read by the device 10, will be stored in the hard disk 108. According to a variant, the program enabling the device to implement the invention can be stored in read only memory 102 (referred to as ROM in the drawing). As a second variant, the program can be received by means of the communication network 113 in order to be stored in a manner identical to that described previously.

The device 10 is connected to a microphone 111. The data to be compressed and possibly transmitted according to the invention will in this case be the audio signal data.

This same device has a screen 104 for displaying the data to be compressed or serving as an interface with the user, who will be able to parameterise certain compression modes, using the keyboard 114 or any other means (a mouse, for example).

The central unit 100 (referred to as CPU in the drawing) will execute the instructions relating to the implementation of the invention, instructions stored in the read only memory 102 or in the other storage elements. On powering up, the coding, transmission or decoding programs stored in a non-volatile memory, for example the ROM 102, are transferred into the random access memory RAM 103, which will then contain the executable code of the invention as well as registers for storing the variables necessary for implementing the invention.

The communication bus 101 allows communication between the different elements included in the microcomputer 10 or connected to it. The representation of the bus 101 is not limitative and notably the central unit 100 is able to communicate instructions to any element of the microcomputer 10 directly or through another element of the microcomputer 10.

In detailing the device 10 it has in particular been assumed that it effects data coding. However, the device 10 can also effect data decoding.

With reference to FIG. 2, a first embodiment of the coding method according to the invention of an image IM includes steps E20 to E36, which are run through by the central unit of the device 10 described above. The method includes overall the decomposition of the image into frequency sub-bands, here according to three resolutions, the coding of each of these sub-bands, and the segmentation of the sub-bands of low frequency for each resolution level.

Step E20 is the decomposition of the image IM into frequency sub-bands, as will be detailed below with reference to FIG. 9. Step E20 results in the sub-bands $LL_3$, $HL_3$, $LH_3$ and $HH_3$ with the lowest resolution $RES_3$, the sub-bands $HL_2$, $LH_2$ and $HH_2$ of intermediate resolution $RES_2$, and the sub-bands $HL_1$, $LH_1$ and $HH_1$ with the highest resolution $RES_1$.

The following step E21 is the coding of the sub-bands of the decomposition. The sub-band of the lowest frequency $LL_3$ is for example coded according to a DPCM (Differential Pulse Code Modulation) coding, and results in the coded sub-band $LLC_3$, which is stored in memory. The other sub-bands, referred to as detail sub-bands, are for example coded by a scalar or vectorial quantisation of the data. These coded sub-bands are also stored in memory.

Step E21 is followed by step E22, which is the decoding of the previously coded sub-bands. The decoding mode used corresponds of course to the coding mode used at the previous step. Step E22 results in the reconstructed sub-bands, notably the sub-band $LLD_3$, which results from the decoding of the sub-band $LLC_3$. It is not necessary to decode the sub-bands of the highest resolution level since, as will be clear subsequently, these decoded sub-bands are not useful.

Subsequently coded and then decoded sub-bands are worked on, which makes it possible to have the same data as at decoding, which will be disclosed hereinafter. However, in the case of compression without loss, it is also possible to work on the sub-bands as produced at step E20.

Step E22 which is followed by step E23, which is the segmentation of the reconstructed sub-band of lowest frequency $LLD_3$. This segmentation step is detailed below with reference to FIG. 3. The result of the segmentation is a segmentation map S3 containing at least two distinct regions covering all the segmented sub-band.

During the following step E24, a parameter i is initialised to the value 1. The parameter i indicates the current resolution level N-i, where N corresponds to the total number of decomposition levels, here three. This indicator will be updated subsequently.

Step E24 is followed by step E25, during which a synthesis is effected on the sub-bands of the resolution level immediately lower than the current level N-i previously considered. The synthesis step results in a reconstructed low sub-band, of resolution immediately greater than the sub-bands which were used for the synthesis. Thus, from the sub-bands $LLD_3$, $LHD_3$, $HLD_3$ and $HHD_3$, a lower sub-band $LLS_2$ of level 2 is reconstructed. The synthesis will be described in more detail below.

The following step E26 is the segmentation of the low sub-band $LLS_{N-i}$ synthesised at the previous step in order to provide a segmentation map of level (N-i); this step is identical to the previously described step E23. The result of the segmentation is a segmentation map $S_{N-i}$ containing at least two distinct regions covering the entire segmented sub-band.

The following step E27 in order to determine whether all the decomposition levels have been processed, that is to say whether the parameter i is equal to N-1. If the test is negative, there remains at least one level to be processed, and in this case step E27 is followed by step E28, which increments the parameter i by one unit, Step E28 is followed by the previously described step E25.

If the test of step E27 is positive, this step is followed by step E29, during which segmentation map SN of maximum resolution level is coded without loss and transmitted. The segmentation can be coded by any coding means without loss known to persons skilled in the art, for example a Freeman coding on the contours. The Freeman code associates with each elementary movement towards one of the neighbours on the contour an entire code in accordance with a pre-established convention. For more details, reference can be made to the collective work: "Images Analysis: Filtering and Segmentation, Masson, 1995".

Step E29 is followed by step E30, which performs an analysis of the segmentation SN. This analysis consists of supplying an order of priority for the regions of the segmentation map at this resolution level, which orders the regions. A simple implementation consists for example of running through the segmentation from the middle of the image, describing a spiral, and classifying, by order of importance, the regions encountered in this movement. According to this procedure, the most important regions are situated at the centre of the image, and the least important at the periphery. This order of importance will generally be suitable for an image of the "head and shoulder" type. For different types of image, more complex methods may be used.

Step E30 is followed by step E31, during which the coefficients of the sub-bands of lowest resolution $LLC_N$, $LHC_N$, $HLC_N$ and $HHC_N$ are transmitted region by region. The order of transmission of the regions is determined by the order of importance issuing from the previous step E30. Thus, if two regions R1 and R2 have been identified and classified in this order of importance, the coefficients of the region R1 (inside the segmentation area determined for the region R1) are transmitted before the coefficients corresponding to the region R2.

During the following step E32, the parameter i is initialised to the value 1, in order to indicate the current resolution level N-i. This indicator will be updated subsequently.

Step E32 is followed by step E33, which effects an analysis of the segmentation S(N-i). This analysis consists of supplying an order of priority for the regions of the segmentation map at this level. This step is identical to the previously described step E30.

Step E33 is followed by step E34, during which the regions of the coded detailed sub-bands of resolution level N-i will be transmitted progressively. This step is identical to the previously described step E31 but applies only to the detail sub-bands, and not to the low-frequency sub-band of the resolution level under consideration.

The following step E35 is a test for determining whether all the levels of the decomposition have been processed. If the test is negative, there remains at least one level to be processed, and in this case step E35 is followed by step E36, which increments the level counter by one unit. Step E36 is followed by the previously described step E33. If the test of step E35 is positive, the coding of the digital image and the progressive transmission of the coded image are terminated. Naturally, if the decomposition of the image is effected on a single resolution level, there is no iteration and the processing is effected solely on this level.

With reference to FIG. 2a, a second embodiment of the coding method according to the invention of an image IM includes steps S20 to S36, which are run through by the central unit of the device 10 described above. The second embodiment of the invention additionally allows a selective coding by object. The method includes overall the decomposition of the image into a plurality of frequency sub-bands on at least two resolution levels, then, for at least one resolution level, the segmentation of at least one sub-band into at least two homogeneous regions, the coding by region of the coefficients of the resolution level under consideration, and, for at least one resolution level, except the highest resolution level, the decoding the coded coefficients of the resolution level under consideration, in order to form decoded sub-bands, and the synthesis of the decoded sub-bands of the resolution level under consideration, on one resolution level, in a synthesised sub-band which will be considered at the following iteration.

Step S20 is the decomposition of the image IM into frequency sub-bands, as will be detailed below with reference to FIG. 9 Step S20 results in the sub-bands $LL_3$, $HL_3$, $LH_3$ and $HH_3$ with the lowest resolution $RES_3$, the sub-bands $HL_2$, $LH_2$ and $HH_2$ of intermediate resolution $RES_2$, and the sub-bands $HL_1$, $LH_1$ and $HH_1$ with the highest resolution $RES_1$.

During the following step S21, a parameter i is initialised to the value 0. The parameter i indicates the current resolution level N-i, where N corresponds to the total number of decomposition levels, here three. This indicator will be updated subsequently.

Step S21 which is followed by step S22, which is the segmentation of a low sub-band $LLS_{N-i}$. This segmentation step is detailed below with reference to FIG. 3. The result of the segmentation is a segmentation map $S_{N-i}$ containing at least two distinct regions covering all the segmented sub-band. The resulting segmentation map has a level (N-i), for example 3 if three decomposition levels are performed. The low sub-band $LLS_{N-i}$ is the sub band $LL_3$ if the indicator i is 0 (first passage) or is the sub-band synthesized at step S27.

Step S22 is followed by step S23, which performs an analysis of the segmentation $S_{N-i}$. This analysis consists of supplying a level of importance for each of the regions of the segmentation map at current resolution level N-i, which orders the regions.

A simple and automatic implementation consists for example of running through the segmentation from the middle of the image, describing a spiral, and classifying, by order of importance, the regions encountered in this movement. According to this procedure, the most important regions are situated at the centre of the image, and the least important at the periphery. This order of importance will generally be suitable for an image of the "head and shoulder" type. For different types of image, more complex methods may be used. In a non-automatic implementation, a user can associate a level of importance to the regions by using the keyboard 112 or the mouse, for example.

The result of step S23 is an analysis AS(N-i) of the segmentation at the current level of resolution. An index, for example a numeral, representing a level of importance, is allocated to each of the regions.

During the following step S24, the coefficients of the sub-bands of resolution level (N-i) are coded region by region or object by object. If the parameter i is zero, the sub-bands under consideration are the sub-bands LL3, LH3, HL3 and HH3. Otherwise, the sub-bands under consideration are the sub-bands LHN-i, HLN-i, and HHN-i. The coding of the region is determined by the allocation of a coding mode as a function of the level of importance determined at step S23. If two regions R1 and R2 have been identified and if a high level of importance has been allocated to region R1 and a low level of importance to region R2, the coefficients of region R1 are coded more precisely than the coefficients of region R2, in order to avoid high loss in quality in region R1. An embodiment of this step is detailed in reference with FIG. 3b.

Step S24 is followed by step S25, during which the coded coefficients of the sub-bands of level of resolution (N-i) are stored in memory in order to be used later, for example during a transmission step. It is to be noted that, if a transmission progressive by region is to be achieved, it is necessary to store the coefficients region by region, taking into account the importance of the region, determined at step S23 and contained in the analysis AS(N-i). Moreover, if several regions have a same level of importance, a index of transmission is allocated to those regions to arrange them in order as a function of their importance, amongst the regions having the same level of importance. The allocation of the index of transmission is similar to the allocation of the level of importance, considering here only the regions having a given level of importance.

Thus, if two regions R1 and R2 have been determined and associated to the respective levels of importance 1 (very important) and 2 (not very important), the coefficients of region R1 are stored in memory before the coefficients of region R2, in order to be transmitted before the coefficients of region R2 in a later step of transmission. If a progressive transmission is not to be performed, but only a transmission by sub-band, it is not necessary to store the sub-band region by region. This step is achieved in the case where a immediate or postponed transmission of the coded data is performed in addition to the coding.

Step S25 is followed by step S26 which is the decoding of the previously coded sub-bands. Of course, the decoding mode corresponds to the coding mode used at previous step. The result of step S26 is reconstructed sub-bands. It is not necessary to decode the sub-bands of the highest level of resolution (level 1) because, as disclosed hereinafter, those decoded sub-bands are not useful.

It is to be noted that this step of decoding must be achieved only in the case where a transmission progressive by region is to be performed. As a matter of fact, in such a case, the progressive decoding, which will be described hereinafter, needs to reconstruct the segmentation map in order to receive the regions progressively. The processing is thus achieved on coded and decoded sub-bands, which allow to have the same data in coding and on decoding If a progressive transmission is not necessary, but only a transmission sub-band by sub-band, the decoding step can be omitted. The processed data are data resulting from step S20.

Step S26 is followed by step S27, during which a synthesis is effected on the sub-bands of the current resolution level N-i. The synthesis step results in a reconstructed low sub-band, of resolution immediately greater than the sub-bands which were used for the synthesis. Thus, from the sub-bands $LLD_3$, $LHD_3$, $HLD_3$ and $HHD_3$, a lower sub-band $LLS_2$ of level 2 is reconstructed. The synthesis will be described in more detail below.

The following step S28 is a test for determining whether all the levels of the decomposition have been processed, that is to say whether parameter i is equal to N−1. If the test is negative, there remains at least one level to be processed, and in this case step S28 is followed by step S29, which increments the parameter i by one unit. Step S29 is followed by the previously described step S22.

If the test of step S28 is positive, that is to say when all the levels of decomposition have been processed, this step is followed by step S30, during which segmentation map SN of minimum resolution level is coded, preferably without loss. The segmentation can be coded by any coding means without loss known to persons skilled in the art, for example a Freeman coding on the contours. The Freeman code associates with each elementary movement towards one of the neighbours on the contour an entire code in accordance with a pre-established convention. For more details, reference can be made to the collective work: "Images Analysis: Filtering and Segmentation, Masson, 1995".

It is to be noted that this coding step is necessary only in the case where a transmission progressive by region is to be achieved. If a transmission by sub-band is to be achieved, this step could be omitted.

With reference to FIG. 2b, a embodiment of the progressive transmission method according to the invention of an image IM, and corresponding to the second embodiment of coding method, includes steps S41 to S45, which are stored in random access memory and run through by the central unit of the device 10 described above. The method includes overall the transmission of the segmentation of low resolution and the transmission of the regions by resolution and by level of importance.

During step S41, the segmentation map SN of lower level of resolution and previously coded at step S30 is transmitted on the network 113. This segmentation map will allow the decoder to receive progressively the regions of the lower resolution level.

During the following step S42, the parameter i is initialised to the value 0. The parameter i indicates the current resolution level N-i. This indicator will be updated subsequently.

Step S42 is followed by step S43, during which the coefficients of the sub-bands of the current resolution level N-i are transmitted region by region. If the parameter i is null, the sub-bands under consideration at this step are the sub-bands LLC3, LHC3, HLC3 and HHC3. Otherwise, the sub-bands under consideration at this step are the sub-bands LHC(N-i), HLC(N-i) and HHC(N-i) The order of transmission of the regions is determined by the order of storage of the coded coefficients (step S25).

The following step S44 is a test for determining whether all the levels of the decomposition have been processed. If a stop information is received, the result of this step is also considered as positive. It is to be noted that such a stop information can stop the transmission any time. If the test is negative, there remains at least one level to be processed, and in this case step S44 is followed by step S45, which increments the parameter i by one unit in order to consider the following resolution level. Step S45 is followed by the previously described step S43, If the test of step S44 is positive, the progressive transmission of the coded image is terminated.

The step E23 or S22 of segmentation of a sub-band is detailed in FIG. 3a and includes the substeps E90 to E92.

Step E90 is a simplification of the sub-band. A simplified version of the sub-band, more generally of an image, will for example be obtained by applying to the latter a morphological opening/closure operator, followed by a morphological reconstruction. A complete description of this method can be found in the article by Philippe Salembier entitled "Morphological multiscale segmentation for image coding", which appeared in the magazine "Signal Processing" No 38 of 1994. This type of processing eliminates the objects smaller than a certain size, and restores the contours of the objects which have not been eliminated. At the end of this step there is therefore a simplified version of the sub-band, which will be easier to process by the following steps.

The following step E91 is the marking of, or removal of the markers from, the simplified sub-band. This step identifies the presence of the homogeneous regions of the simplified sub-band, using a criterion which can, for example, be a criterion of homogeneity of the intensity of the region (flat regions). Concretely, a region growth algorithm is for example used here: the sub-band is scanned in its entirety (for example from top to bottom and right to left). A "kernel" is sought, that is to say a point, here a coefficient, representing a new region (the first coefficient of the sub-band will automatically be one of these). The characteristic of this region (mean value) is calculated on the basis of this point. Then all the neighbours of this point will then be examined, and for each of the neighbours two possibilities are offered:

if the point encountered has an intensity close to at the mean value of the region under consideration, it is allocated to the current region, and the statistics of this region are updated according to this new element, if the point encountered has an intensity different (in the sense of a proximity criterion) from the mean value of the region, it is not allocated to the region (it may subsequently be considered to be a new "kernel" representing a new region).

All the neighbours allocated to the current region are then themselves subjected to examination, that is to say all the neighbours are examined (growth phase).

The processing of the region continues thus until all the points adjacent to points belonging to the region have been examined. At the end of this processing, the region is considered good or bad If it is bad (typically, too small), it is the decision step which will process the points of the region in question. If it is good, the processing is terminated for it. A unique label or identifier is then allocated to all the points in the region. The global processing then continues with the search for a new kernel.

The following step E92 is the decision. It consists of attaching to a region all the points which have no label at the end of the marking step E91 (typically, the points which have been attached to excessively small regions). This step can be effected simply by considering each of the points which does not have a label, and allocating it to the adjacent region to which it is closest (in the sense of a proximity criterion).

Step S24 of coding by object in the sub-bands is detailed with reference to FIG. 3b and includes sub-steps E80 to E84.

Step E80 is the extraction of each of the regions due to the segmentation map SN-i obtained at step S22. For example, regions can be extracted by order of importance, according to the level of importance which has been allocated at step S23, or, as a variant, in any order.

Following step E81 reads the importance associated with each of the regions which have been extracted. This importance can be relative, if the regions have been classified by order, or absolute. In this embodiment, it is supposed that the importance of the regions is absolute, and that an indicator representing its importance is allocated to each of the regions. For example, two regions R1 and R2 have been identified and the indicators IN=1 (important region) and IN=2 (not very important region) have been respectively allocated to them.

The following step E82 is the association of a coding mode to each of the regions under consideration Several types of coding can be used, according to the importance of the region which has been extracted: for example, coding without loss for an important region, scalar or vector quantization for a less important region. One embodiment is determined by a quantization, that is to say, for a scalar quantization, by the quantization step. For example, a quantization step equal to two, that is to say a quantization Q1, is associated to the region R1 (IN=1, important region) and a quantization step equal to ten, that is to say a quantization Q2, is associated to the region R2 (IN=2, not very important region).

The following step E83 is the quantization of all the coefficients of all the sub-bands for each region under consideration, at the resolution level under consideration, by the previously determined quantization. For a given region, all the coefficients inside a contour determined by the segmentation, for this region, are taken into account.

The following step E84 is the entropic coding of all the coefficients quantified at the previous step.

As a variant, a coding by bit plane can be implemented inside each region, which allows a scalability of the quality of the reconstructed image.

According to the example embodiment chosen and depicted in FIG. 4 and corresponding to the first embodiment of the invention, a digital image IM is decomposed into sub-bands, segmented and then coded progressively before transmission.

The image IM is decomposed into sub-bands (step E20). Three successive analysis units decompose the image successively into three sets of sub-bands 31, 32 and 33, according to three resolution levels $RES_1$, $RES_2$ and $RES_3$.

All the sub-bands $LL_3$, . . . , $HH_1$ issuing from the decomposition are then coded, which forms coded sub-bands $LLC_3$, . . . , $HHC_1$, in accordance with step E21. The resulting structure 34 is then decoded (step E22), using decoding means corresponding to the coding used at the previous step. Then the structure 35 containing all the decoded sub-bands $LLD_3$, . . . , $HHD_2$, is obtained, except for those which correspond to the highest resolution level.

The following step consists of effecting a segmentation on the sub-band of lowest decoded frequency $LLD_3$. This segmentation S3 contains for example two regions $R_31$ and $R_32$, where $R_32$ represent the background and $R_31$ the head of a person.

The following step is a synthesis on a level of the sub-bands of lowest resolution $RES_1$. The result of the synthesis is a reconstructed sub-band $LLS_2$ on which a second segmentation is effected. A segmentation map S2 is obtained containing for example three regions $R_2 1$ (head), $R_2'2$ (body) and $R_2'3$ (background). The notation R' is used when a region of a given resolution level is divided into two regions at the higher resolution level. For example, the background $R_3 2$ of the segmentation map S3 is divided into two objects $R_2'2$ and $R_2'3$ (body and background) in the segmentation map S2.

The following step is a synthesis on a level of the sub-bands of immediately higher resolution $RES_2$. The result of the synthesis is a reconstructed sub-band $LLS_1$ on which a third segmentation is effected. A segmentation map S1 is obtained containing the regions $R_1 1$ (Head), $R_1'2$ (Body), $R_1''3$ (Moon) and $R_1''4$ (Background).

The last step of the coding, not depicted in this figure, will consist of ordering the regions (typically head, body, moon, background in decreasing order of importance), and transmitting the coefficients corresponding to these regions level by level and region by region. In this example, the end point is then the bit stream structure depicted in FIG. 4b.

According to the example embodiment chosen and depicted in FIG. 4a and corresponding to the second embodiment of the invention, a digital image IM is decomposed into sub-bands, segmented and then coded progressively before transmission.

The image IM is decomposed into sub-bands (step 320) Three successive analysis units decompose the image successively into three sets of sub-bands 31, 32 and 33, according to three resolution levels $RES_1$, $RES_2$ and $RES_3$.

The following step is a segmentation of the sub-band of lower frequency LL3. The segmentation S3 includes for example two regions R31 and R32, where R32 is the background and R31 is the head of a person.

After the step S23, not shown here, during which a level of importance is allocated to each region, the sub-bands of resolution level RES3 $LL_3$, ... $HH_3$, are then coded by region, which forms coded sub-bands $LLC_3$, ... $HHC_3$, according to step S24. Each region is quantified with the quantization corresponding to ist level of importance, then coded by an entropic coding. The sub-bands of low resolution of the resulting structure 34 are decoded (step S26), using decoding means corresponding to the coding used at step S24. Then the structure 35 containing the decoded sub-bands $LLD_3$, ..., $HHD_3$ at the resolution level $RES_3$, is obtained.

The following step is a synthesis on a level, of the sub-bands of lowest resolution $RES_3$. The result of the synthesis is a reconstructed sub-band $LLS_2$ on which a second segmentation is effected. A segmentation map S2 is obtained containing for example three regions $R_2 1$ (head), $R_2'2$(body) and $R_2'3$ (background). The notation R' is used when a region of a given resolution level is divided into two regions at the higher resolution level. For example, the background $R_{32}$ of the segmentation map S3 is divided into two objects $R_2'2$ and $R_2'3$ (body and background) in the segmentation map S2.

The following step (not shown) is a coding by region of the sub-bands of resolution level $RES_2$. The sub-bands $LH_2$, $HL_2$ and $HH_2$ from the decomposition are then coded, which forms coded sub-bands $LHC_2$, $HLC_2$ and $HHC_2$ (step S24). The resulting structure is then decoded (step S26), using decoding means corresponding to the coding used at the previous step. The decoded sub-bands $LLD_2$, ..., $HHD_2$, at the resolution level $RES_2$, are obtained.

The following step is a synthesis on a level of the sub-bands of immediately higher resolution $RES_2$. The result of the synthesis is a reconstructed sub-band $LLS_1$ on which a third segmentation is effected. A segmentation map S1 is obtained containing the regions $R_1 1$ (Head), $R_1'2$ (Body), $R_1''3$ (Moon) and $R_1''4$ (Background).

The last step is a coding by region of the sub-bands of resolution level $RES_1$.

FIG. 4b depicts the bit stream corresponding to the examples of FIGS. 4 and 4a.

According to this example, a digital image IM has been decomposed into sub-bands, and each of the sub-bands coded A hierarchical segmentation consisting of the segmentation maps S3, S2, S1 (segmentation map of each level) has been calculated. This hierarchical segmentation contains a total of four objects R1 (head), R2 (body), R3 (crescent moon), R4 (background) which can be found in S3 ($R_3 1$, $R_3 2$), in S2 ($R_2 1$, $R_2'2$ and $R_2'3$) and in S1 ($R_1 1$, $R_1'2$, $R_1''3$ and $R_1''4$).

The construction of the bit stream will be effected in a completely hierarchical manner, both in resolution and in number of objects. To do this, the coder stores the coded data available to it in a manner which is increasing in resolution (from $RES_3$ to $RES_1$) and in objects (from R1 to R4).

The first step consists of putting the segmentation map of the lowest resolution, S3, in the bit stream. This is because this segmentation must absolutely be transmitted to the decoder if it is wished to transmit the associated regions to it one after the other.

In a second step, the coefficients of the coded sub-bands $LLC_3$, ..., $LHC_3$ are inserted in the bit stream, by order of importance of the regions associated with them. Thus the coefficients corresponding to $R_3 1$, and then to $R_3 2$, are transmitted.

In a third step, the coefficients of the sub-bands $LHC_2$, ..., $HHC_2$ are inserted in the bit stream, by order of importance of the regions. Thus the coefficients corresponding to $R_2'1$, then to $R_2'2$, and then to $R_2'3$, will be transmitted.

In a fourth step, the coefficients of the sub-bands $LHC_1$, ..., $HHC_1$ are inserted in the bit stream, by order of importance of the regions. Thus the coefficients corresponding to $R_1 1$, then to $R_1'2$, then to $R_1''3$, then to $R_1''4$, will be transmitted.

The result is that the data are stored by order of importance (in the sense of the object) and by order of increasing resolution.

With reference to FIG. 5, one embodiment of the method according to the invention of decoding an image IM coded according to the coding method disclosed above includes steps E400 to E412, which are run through by the central unit of the device 10 described above. It is to be noted that the decoding method is the same for the two embodiments of the coding method.

The decoding method includes overall the reception or calculation of the segmentation at each resolution level, analysis of this segmentation, reception and decoding of each of the sub-band coefficient regions in order of analysis, and the synthesis of the low sub-band of higher level and for the last level, the synthesis of the original image.

Step E400 is the reception and decoding of the segmentation map SN of the lowest resolution level. It is assumed that this segmentation was coded by a method without loss, and the segmentation without loss is therefore recovered. The decoding method naturally corresponds to the coding method which was used at the coder (step E29).

Step E400 is followed by step E401, during which the segmentation is analysed, by a method identical to that described during step E30 of the coding method. At the end of this analysis, there is a classification of the regions by order of importance corresponding to the order of transmission, and consequently of reception, of these regions.

Knowing the form of the regions and the order of reception, it is possible, during step E402, to progressively receive the sub-band coefficients of the regions in question. During this same step E402, these regions are decoded by a decoding method corresponding to the coding method used at the time of coding, and described in step E22 of FIG. 2.

Step E402 is followed by step E403, during which the sub-bands of the lowest resolution level are reconstituted by adding, sub-band by sub-band, the coefficients received for each region. As, by definition, there is no overlap between the regions defined by the segmentation, the addition amounts to a superimposition of all the coefficients of all the regions.

During the following step E404, a parameter i is initialised to the value 1. The parameter i is a level indicator for indicating the current resolution level N-i This indicator will be updated subsequently.

Step E404 is followed by step E405, during which a synthesis is effected on the resolution level immediately below the current level. The synthesis step results in a reconstructed low sub-band of resolution immediately greater than the sub-bands which were used for synthesis. This step is identical to step E25 of the coding method. It supplies at an output the synthesised low sub-band $LLS_{N-i}$. During step E406, this sub-band is segmented in order to supply the segmentation map S(N-i). Step E406 is identical to step E26 of the coder.

Step E406 is followed by step E407, during which the segmentation S(N-i) is analysed. This step is identical to the step E33 of the coder. At the end of this analysis, there is available a classification of the regions by order of importance which, as before, corresponds to the order of transmission, and therefore of reception, of these regions.

Knowing the form of the regions and the order of reception, it is possible, during step E408, to progressively receive the sub-band coefficients of the regions in question, and to decode them by a decoding method corresponding to the coding method used in the coding process.

Step E408 is followed by step E409, during which the sub-bands of the current resolution level are reconstituted by adding, sub-band by sub-band, the coefficients received for each region.

The following step E410 is a test in order to determine whether all the levels of the required decomposition have been processed, that is to say whether the parameter i is equal to N−1. If the test is negative, there remains at least one level to be processed, and in this case step E410 is followed by step E411, which increments the parameter i by one unit. Step E411 is followed by step E405 previously described.

If the test of step E410 is positive, then this step is followed by step E412, which is the synthesis of the sub-bands of the highest resolution level in the decomposition. This synthesis results in the reconstructed image.

It should be noted that, for reasons such as sufficiency of quality of the image received or excessively high waiting time, the user of the decoding device can, for example by means of the keyboard, interrupt the decoding of said signal.

For this purpose, for example, the central unit periodically reads the state of the keyboard and, when an item of information representing the interruption of the reception is generated, the central unit sets an interrupt variable STOP at level 1. When step E410 is then run through, the variable STOP being at level 1, the test will be positive and step E410 will be followed by step E412, which will supply the image synthesised form the data available at that time. This interruption information can be transmitted to the coder through the network.

According to the chosen example embodiment depicted in FIG. 6, a digital image coded as previously described is received by progressive transmission, decoded and then reconstructed on three resolution levels $RES_1$, $RES_2$ and $RES_3$.

This figure illustrates the decoding steps corresponding to the coding steps of FIG. 4 or 4a, and to the bit stream of FIG. 4b.

At the lowest resolution level $RES_3$, the decoder first of all receives the segmentation map S3 of level 3. This segmentation is decoded and analysed, in accordance with the steps described in FIG. 5. Analysis of this segmentation makes it possible to detect two regions $R_31$ (head) and $R_32$ (background), in this order.

The coefficients corresponding to the region $R_31$ in the sub-bands $LLC_3$, $LHC_3$, $HLC_3$ and $HHC_3$ are then received and decoded, and then the coefficients of these same sub-bands corresponding to the region $R_{32}$ are received and decoded. The two sets of sub-bands corresponding to $R_31$ and $R_32$ are added (sub-band by sub-band), in order to reconstruct the sub-bands $LLC_3$, ..., $HHC_3$ in their entirety (structure 500). A synthesis on one level is effected, in order to synthesise the higher-level low sub-band $LLS_2$. This low sub-band (identical to the low sub-band $LLS_2$ formed at coding) is then segmented in order to produce the map of the segmentation S2 which is identical to the segmentation S2 determined at the time of coding.

At the second resolution level, analysis of the segmentation S2 will make it possible to control the reception of the regions one after the other: in our example, analysis of the segmentation S2 makes it possible in fact to classify the three regions of level 2 by order of priority, and therefore of reception; $R_21$ (head), $R_2'2$ (body), then $R_2'3$ (background). When all the regions of level 2 have been received, these regions are added to each other in order to produce the sub-bands $HHC_2$, $LHC_2$, $HLC_2$ of level 2.

As in addition the low sub-band $LLS_2$ is available, synthesised at the previous step, the synthesis on one level of the sub-bands of level 2 is now possible, which will produce the sub-band $LLS_1$ of level 1. This low sub-band (identical to the low sub-band $LLS_1$ formed at the time of coding) is then segmented in order to produce the segmentation S1 (identical to the segmentation S1 determined at the time coding).

At the highest resolution level $RES_1$, analysis of the segmentation S1 will make it possible to control the reception of the regions one after the other. In this example, analysis of S1 makes it possible in fact to classify the four regions of level 1 by order of priority, and therefore of reception: $R_11$ (head), $R_1"2$ (body), $R_1"3$ (crescent: moon), and finally $R_1"4$ (background). When all the regions of level 1 have been received, these regions are added to each other in order to produce the sub-bands $HHC_1$, $LHC_1$, $HLC_1$ of level 1. As the low sub-band $LLS_1$ synthesised at the previous step is also available, a procedure of synthesis on one level of the sub-bands of level 1 can be started, which will produce the reconstructed image IM'. The decoding is terminated.

It is important to note that it is possible to interrupt the decoding at any one of the steps mentioned above. It will nevertheless be possible to supply at least part of the reconstructed image IM (at a reduced resolution, with a smaller number of objects . . . ). True scalability has therefore been achieved, both spatial and in number of objects.

In accordance with FIG. 7, a first embodiment of device according to the invention is represented. The digital signal to be compressed S1 is in this particular embodiment a series of digital samples representing an image.

The device D has a signal source 30, here of an image signal, whether a fixed image or an image sequence. In general terms, the signal source either contains the digital signal, and has for example a memory, a hard disk or a CD-ROM, or converts an analogue signal into a digital signal, and is for example an analogue camcorder associated with an analogue to digital converter. The image source 30 generates a series of digital samples representing an image IM. The image signal IM is a series of digital words, for example bytes. Each byte value represents a pixel of the image IM, here with 256 grey levels or in colour.

An output of the signal source 30 is connected to an analysis circuit, or a circuit for decomposition into sub-bands 60. The circuit 60 has a first output $60_1$ connecting to a coding circuit 61. This coding circuit 61 receives the sub-band of lowest frequency and codes the data according to conventional techniques such as DPCM (Differential Pulse Code Modulation) coding, which is a coding by linear prediction, with loss. Each pixel of the sub-band to be coded $LL_3$ is predicted according to its neighbours, and this prediction is subtracted from the value of the pixel under consideration, for the purpose of forming a differential "image" which has less correlation between pixels than the original image.

This coding circuit 61 is connected to a segmentation circuit 62 which will generate a segmentation map containing at least two distinct regions covering the entire segmented sub-band. It is also connected to a decoding and synthesis circuit 65, so as to supply to the latter the sub-band of lowest frequency. The coding circuit 61 is finally connected to a transmission circuit 68.

The sub-band of lowest frequency thus segmented is coded by the unit 63 according to a coding without loss, that is to say a coding giving rise to no degradation of the information, typically a Freeman coding on the contours. The circuit 63 is connected to a transmission circuit 68 in order to supply to it the result of the coding of the segmentation map of the sub-band of lowest frequency.

Second outputs $60_2$ of the decomposition circuit 60 are connected to a circuit for coding the coefficients of the decomposition 64. The circuit 64 has its output connected to the information transmission unit 68. The circuit 64 is connected to the decoding and synthesis circuit 65, which will, if the coefficients have been coded according to a DPCM method previously described, perform a decoding in the form of inverse DPCM, and the inverse of a decomposition (synthesis of one level) into sub-bands on one level, that is to say the recomposition of the level higher than the current level, in the form of the low sub-band of this higher level. Conventionally, a synthesis step includes operations of oversampling and filtering, the filterings being the inverse of those used at the time of analysis.

If the coding is restricted to a quantisation step, the inverse of a decomposition into sub-bands on one level can be effected directly.

The synthesis unit 65 supplies the image thus recreated to the segmentation circuit 66, identical in this example to the unit 62. The circuit 66 effects a segmentation of the low-frequency sub-bands of each resolution level.

The circuit 66 is connected to an analysis circuit 67. The latter receives the result of the segmentation and analyses the content of the segmentation in order to determine the order of the regions for each resolution level. The circuit 67 is connected to the transmission circuit 68.

The coded sub-bands $LHC_3$, $HLC_3$ and $HHC_3$, and the coded sub-bands of higher resolution $HLC_2$, $LHC_2$, $HHC_2$, $HLC_1$, $LHC_1$ and $HHC_1$ are supplied to the transmission circuit 68, according to increasing resolutions. In accordance with the analysis effected by the circuit 67, the sub-band coefficients of a given resolution level are ordered by region as depicted in FIG. 4a.

According to a preferred embodiment of the invention, the circuits mentioned above can be implemented by a microprocessor associated with random access and read only memories. The read only memory has a program for decoding the data, and the random access memory has registers adapted to record variables modified during the running of the program.

The circuit for decomposition into sub-bands 60, or analysis circuit, is a conventional set of filters, respectively associated with decimators by two, which filter the image signal in two directions, in sub-bands of high and low spatial frequencies.

In accordance with FIG. 7a, a second embodiment of device according to the invention is represented. The digital signal to be compressed SI is in this particular embodiment a series of digital samples representing an image.

The device D' has a signal source 30, here of an image signal, whether a fixed image or an image sequence. In general terms, the signal source either contains the digital signal, and has for example a memory, a hard disk or a CD-ROM, or converts an analogue signal into a digital signal, and is for example an analogue camcorder associated with an analogue to digital converter. The image source 30 generates a series of digital samples representing an image IM. The image signal IM is a series of digital words, for example bytes. Each byte value represents a pixel of the image IM, here with 256 grey levels or in colour.

An output of the signal source 30 is connected to an analysis circuit, or a circuit for decomposition into sub-bands 71. The circuit 71 is analogous to circuit 60 (FIG. 7).

The circuit 71 is connected to a segmentation circuit 72 which process the low sub-band LLSN-i of the current resolution level in order to supply a segmentation map of level N-i. The low sub-band LLSN-i is the sub-band LL3 at the first passage, otherwise it is a sub-band synthesized by a synthesis circuit 77. The result of the segmentation is a segmentation map $S_{N-i}$ containing at least two distinct regions covering the entire segmented sub-band. The segmentation map of lower resolution level is applied to a coding circuit 79 which codes it for example according to a coding without loss. The coding circuit 79 is connected to a memory 75 in which the coded segmentation map of lower resolution level is stored, in order to be used later, for example transmitted.

The circuit 72 is connected to a circuit 73 for classifying segmented regions. Circuit 73 allocates a respective level of importance to the regions of the segmentation map at the processed resolution level This allocation can be automatic or not. For example, the user can select the regions on the screen and manually associate a level of importance with the keyboard 112 or any other means such as the mouse. The circuit 73 produces an analysis AS(N-i) of the segmentation at the current resolution level, which allocates to each region a level of importance and/or a transmission index.

The circuit 73 is connected to a circuit 74 for coding the coefficients of the sub-bands of resolution level (N-i) region by region. The coding of the regions is determined by the allocation of a coding mode to each region according to its level of importance.

The coded coefficients of the sub-bands of resolution level (N-i) are stored by the memory 75 in order to be used later during a step of transmission for example. It is to be noted that if a transmission progressive by region is to be performed, it is necessary to store the coefficients region by region, by order of importance of the region. If only a transmission by sub-band is to be performed, the sub-band can be stored without taking into account the regions.

The memory 75 is linked to a transmission circuit 78 known per se.

The memory 75 is also connected to a circuit 76 for decoding the coefficients previously coded by the circuit 74. Thus, the coder processes data which are similar to that of the decoder. The main advantage is that only the segmentation map of lower resolution is to be transmitted, which needs a low passband.

The decoding mode corresponds to the coding mode used in circuit 74.

The circuit 76 is connected to the circuit 77 for synthesise the sub-band of the current level. This synthesis results in a reconstructed low sub-band, having a resolution immediately higher than the sub-band which were used in the synthesis This synthesised low sub-band is applied to segmentation circuit 72. For example, a low sub-band $LLS_2$ of resolution level $RES_2$ is reconstructed from the sub-bands $LLD_3$, $LHD_3$, $HLD_3$ and $HHD_3$.

It is to be noted that the sub-bands of the higher resolution level are not processed by the decoding circuit 76 nor by the synthesis circuit 77.

The transmission circuit 78 transmits successively the coded and stored segmentation map of lower resolution, then for each level, the coefficients of each of the sub-bands region by region according to an order identical to the order produced by the analysis of the segmentation. For example, the sub-bands of resolution: level $RES_3$ are transmitted, then the sub-bands of resolution level $RES_2$ and finally the sub-bands of resolution level $RES_1$.

According to a preferred embodiment of the invention, the circuits mentioned above can be implemented by a microprocessor associated with random access and read only memories. The read only memory has a program for decoding the data, and the random access memory has registers adapted to record variables modified during the running of the program.

The circuits for decomposition into sub-bands 60 and 71, or analysis circuits, are conventional sets of filters, respectively associated with decimators by two, which filter the image signal in two directions, in sub-bands of high and low spatial frequencies.

According to FIG. 8, the circuit 60, or the circuit 71, has three successive analysis units for decomposing the image IM into sub-bands according to three resolution levels.

In general terms, the resolution of a signal is the number of samples per unit length used for representing this signal. In the case of an image signal, the resolution of a sub-band is related to the number of samples per unit length for representing this sub-band. The resolution depends notably on the number of decimations effected.

The first analysis unit receives the digital image signal and applies it to two digital filters, respectively low pass and high pass 601 and 602, which filter the image signal in a first direction, for example horizontal in the case of an image signal. After passing through decimators by two 6100 and 6200, the resulting filtered signals are respectively applied to two filters, low pass 603 and 605, and high pass 604 and 606, which filter them in a second direction, for example vertical in the case of an image signal. Each resulting filtered signal passes through a respective decimator by two 6300, 6400, 6500 and 6600. The first unit delivers at an output four sub-bands $LL_1$, $LH_1$, $HL_1$ and $HH_1$ of the highest resolution $RES_1$ in the decomposition.

The sub-band $LL_1$ has the components, or coefficients, of low frequency, in both directions, of the image signal. The sub-band $LH_1$ has the components of low frequency in a first direction and of high frequency in a second direction, of the image signal. The sub-band $HL_1$ has the components of high frequency in the first direction and the components of low frequency in the second direction. Finally, the sub-band $HH_1$ has the components of high frequency in both directions.

Each sub-band is an image constructed from the original image, which contains information corresponding to a respectively vertical, horizontal and diagonal orientation of the image, in a given frequency band.

The sub-band $LL_1$ is analysed by an analysis unit similar to the previous one in order to supply four sub-bands $LL_2$, $LH_2$, $HL_2$ and $HH_2$ of intermediate resolution level $RES_2$ in the decomposition. The sub-band $LL_2$ has the components of low frequency in the two analysis directions, and is in its turn analysed by the third analysis unit similar to the two previous ones. The third analysis unit supplies the sub-bands $LL_3$, $LH_3$, $HL_3$ and $HH_3$, of lowest resolution $RES_3$ in the decomposition, resulting from the division into sub-bands of the sub-band $LL_2$.

Each of the sub-bands of resolution $RES_2$ and $RES_3$ also corresponds to an orientation in the image.

The decomposition effected by the circuit 60 is such that a sub-band of a given resolution is divided into four sub-bands of lower resolution and therefore has four times more coefficients than each of the sub-bands of lower resolution.

A digital image IM at the output of the image source 30 is depicted schematically in FIG. 9, whilst FIG. 10 depicts the image IMD resulting from the decomposition of the image IM, into ten sub-bands according to three resolution levels, by the circuit 60. The image IMD has as much information as the original image IM, but the information is divided frequency-wise according to three resolution levels.

The level of lowest resolution $RES_3$ includes the sub-bands $LL_3$, $HL_3$, $LH_3$ and $HH_3$, that is to say the sub-bands of low frequency in the two analysis directions. The second resolution level $RES_2$ includes the sub-bands $HL_2$, $LH_2$ and $HH_2$ and the level of highest resolution $RES_1$ includes the sub-bands with the highest frequency $HL_1$, $LH_1$ and $HH_1$.

The sub-band $LL_3$ of lowest frequency is a reduction of the original image. The other sub-bands are detail sub-bands.

Naturally, the number of resolution levels, and consequently of sub-bands, can be chosen differently, for example 13 sub-bands and four resolution levels, for a bidimensional signal such as an image. The number of sub-bands per resolution level can also be different. The analysis and synthesis circuits are adapted to the dimension of the signal processed.

With reference to FIG. 11, the decoding device 11 performs overall operations which are the reverse of those of the coding device. The decoding device is integrated into a processing and digital display apparatus, which is for example a digital image reader, or a digital video sequence player, or a database management system, or a computer.

One and the same apparatus may include both the coding device and the decoding device according to the invention, so as to perform coding and decoding operations.

The decoding device has a coded data source 1106 which includes for example a reception circuit associated with a buffer. The source 1106 supplies a binary stream of information received which contains first of all the coded segmentation map of the lowest resolution level, and then the coefficients of the sub-bands decomposed and coded by the coder.

The output 1106₁ of the circuit 1106 is connected to a circuit 1107 for decoding the segmentation map. This circuit is connected to a circuit 1100 for analysing the segmentation map.

The output 1106₁ of the circuit 1106 is also connected to a coefficient decoding circuit 1101. The source 1106 thus supplies, to the circuit 1101, the coefficients of the sub-bands decomposed and coded by the coder, so that the circuit 1101 decodes them.

The circuits 1100 and 1101 are connected to the sub-band reconstruction circuit 1102. The latter receives the decoded segmentation map and the coefficients of the decoded sub-bands, and reconstructs, with the two types of information, the transmitted sub-band.

As detailed with reference to FIGS. 5 and 6, the decoder receives first of all the segmentation map of level 3, uses it to determine regions, and then receives in order the sub-band coefficients corresponding to the regions. When all the regions have been received, the sub-bands of the resolution level under consideration have been received and can be reconstructed.

The circuit 1102 is connected to a synthesis circuit 1103 which receives the reconstructed sub-bands and effects a synthesis on a level of the latter.

The circuit 1103 is connected to a segmentation circuit 1104 and to a use circuit 1105. When the image has not been completely reconstructed, the data in the course of decoding are transmitted to the circuit 1104, which effects a segmentation thereof. In fact, according to the invention, only the segmentation map on one level and more particularly the segmentation map on the low sub-band of the lowest decomposition level is transmitted. It is therefore necessary for the decoder to recreate, for each of the other decomposition levels, the associated segmentation map. Advantageously and according to the invention as the segmentation at the level of the coder was effected after the coding or more simply the quantisation, the decoder will have the same information as the coder and will be able to reconstruct an identical segmentation map.

The circuit 1104 is connected to the unit analysing the segmentation map 1100 previously described in order to supply this segmentation map to it. The coefficients of the sub-bands of the higher level having been received and decoded by the unit 1101, a reconstruction of the low sub-band of higher level can be effected by the circuit 1102, the decoding device having available the two items of information necessary to the reconstruction thereof. These iterations will be effected as many times as there are decomposition levels.

When all the resolution levels have been run through, the circuit 1103 synthesises the reconstructed image and supplies it to the use circuit 1105.

According to a variant, the reconstruction steps can be interrupted at any moment by the user by means of the keyboard 114 (FIG. 1 ).

According to a preferred embodiment of the invention, the circuits mentioned above can be implemented by a microprocessor associated with random access and read only memories. The read only memory contains a program for decoding the data, and the random access memory contains registers adapted to record variables modified during the running of the program.

Naturally, the present invention is in no way limited to the embodiments described and depicted, but quite the contrary encompasses any variant within the capability of a person skilled in the art.

What is claimed is:

1. A method of coding a set of data representing physical quantities, comprising the steps of:

decomposing the set of data into a plurality of frequency sub-bands on at least one resolution level, coding the sub-bands, decoding the coded sub-bands, then, for each resolution level, segmenting at least one sub-band into at least two homogeneous regions, in order to form a segmentation map, ordering the regions according to a predetermined criterion, and ordering the coding data of the sub-bands as a function of the order of the regions.

2. The method according to claim 1, including coding the segmentation map of at least one resolution level.

3. The method according to claim 1, including coding the segmentation map of the lowest resolution level in the decomposition.

4. The method according to any one of claims 1 to 3, in which the segmentation is effected on the sub-band of lowest frequency of the resolution level under consideration.

5. The method according to any one of claims 1 to 3, in which the ordering criterion depends on an analysis of the segmentation.

6. The method according to any one of claims 1 to 3, further comprising the steps of transmitting the segmentation map determined at the lowest resolution level and coding data of all the sub-bands, for all the resolution levels.

7. A method of coding a set of data representing physical quantities, comprising the steps of:

decomposing the set of data into a plurality of frequency sub-bands on at least two resolution levels, then, for at least one resolution level, segmenting at least one sub-band of the resolution level under consideration into at least two homogeneous regions, ordering the regions according to a predetermined criterion, coding in the order previously determined by region coefficients of the resolution level under consideration, and, for at least one resolution level, except the highest resolution level, decoding the coded coefficients of the resolution level under consideration, in order to form decoded sub-bands, and synthesising the decoded sub-bands of the resolution level under consideration, on one resolution level, in a synthesised sub-band which will be considered at the following iteration.

8. The according to claim 7, in which, at said segmenting step, the sub-band with the lowest frequency is segmented.

9. The method according to any one of claims 7 to 8, in which, in said coding step, one coding mode amongst a set of coding modes is allocated to each region, according to a criterion of importance for each region.

10. The method according to claim 9, in which the coding modes include a quantisation and an entropic coding, and the coding modes are differentiated from each other by the quantisation interval used.

11. The method according to any one of claims 7 to 8, in which a stop signal generated externally to the process stops the process.

12. A method of transmitting a set of data representing physical quantities, including the coding method according to any one of claims 7 to 8, including the step of transmitting the coded coefficients.

13. The transmitting method according to claim 12, further comprising the step of transmitting a segmentation map formed at said segmenting step.

14. The transmitting method according to claim 13, in which the segmentation map transmitted is the segmentation map formed during the segmentation of the low sub-band with the lowest resolution.

15. The transmitting method according to claim 12, in which the coefficients are transmitted in an order dependent on a criterion of importance of the regions.

16. A method of decoding data representing physical quantities coded by the coding method according to any one of claims 1 to 3, in which, for a given resolution level, said decoding method includes the steps of:
  analyzing the segmentation in order to classify the regions according to a predetermined criterion,
  decoding the coding data of the sub-bands of the resolution level under consideration as a function of a result of said analyzing step,
  reconstructing the sub-bands, and
  synthesizing the reconstructed sub-bands.

17. A device for coding a set of data representing physical quantities, comprising:
  means of decomposing the set of data into a plurality of frequency sub-bands on at least one resolution level,
  means of coding the sub-bands,
  means of decoding the coded sub-bands,
  means of segmenting, for each resolution level, at least one sub-band into at least two homogeneous regions, in order to form a segmentation map,
  means of ordering the regions according to a predetermined criterion, and
  means of ordering the coding data of the sub-bands as a function of the order of the regions.

18. The device according to claim 17, further comprising means of coding the segmentation map of at least one resolution level.

19. The device according to claim 17, further comprising means of coding the segmentation map of the lowest resolution level in the decomposition.

20. The device according to any one of claims 17 to 19, in which said segmenting means effect a segmentation of the sub-band of lowest frequency of the resolution level under consideration.

21. The device according to any one of claims 17 to 19, adapted to implement an ordering criterion which depends on an analysis of the segmentation.

22. The device according to any one of claims 17 to 19, further comprising means of transmitting the segmentation map determined at the lowest resolution level and coding data of all the sub-bands, for all the resolution levels.

23. The device according to any one of claims 17 to 19, in which said means of segmentation, ordering, coding and ordering are incorporated in:
  a microprocessor,
  a read only memory containing a program for coding the set of data, and
  a random access memory containing registers adapted to record variables modified during the running of said program.

24. A device for coding a set of data representing physical quantities, comprising:
  means of decomposing the set of data into a plurality of frequency sub-bands on at least two resolution levels,
  means of segmenting at least one sub-band of at least one resolution level under consideration into at least two homogeneous regions,
  means of ordering the regions according to a predetermined criterion,
  means of coding in the order previously determined by region coefficients of the resolution level under consideration,
  means of decoding the coded coefficients of the resolution level under consideration, except the highest resolution level, in order to form decoded sub-bands, and
  means of synthesising the decoded sub-bands of the resolution level under consideration, on one resolution level, in a synthesised sub-band which will be supplied to the segmenting means.

25. The device according to claim 24, in which said segmenting means are adapted to segment the sub-band with the lowest frequency.

26. The device according to any one of claims 24 to 25, in which said coding means are adapted to allocate to each region one coding mode amongst a set of coding modes, according to a criterion of importance of each region.

27. The device according to claim 26, in which the coding means are adapted to implement coding modes which include a quantisation and an entropic coding, and which are differentiated from each other by a quantisation interval used.

28. The device according to any one of claims 24 to 25, adapted to receive a stop signal generated externally to the device which stops the functioning of the device.

29. A device for transmitting a set of data representing physical quantities, including said coding device according to any one of claims 24 to 25, comprising means of transmitting the coded coefficients.

30. The transmitting device according to claim 29, further comprising means of transmitting a segmentation map formed at the segmentation step.

31. The transmitting device according to claim 30, adapted to transmit the segmentation map formed during the segmentation of the low sub-band with the lowest resolution.

32. The transmitting device according to claim 29, adapted to transmit the coefficients in an order dependent on a criterion of importance of the regions.

33. The device according to any one of claims 24 to 25, in which the decomposition, segmentation, ordering, coding, decoding and synthesis means are incorporated in:
  a microprocessor,
  a read only memory containing a program for processing the data, and
  a random access memory containing registers adapted to record variables modified during the running of said program.

34. A device for decoding data representing physical quantities coded by said coding device according to any one of claims 17–19, 24, or 25, comprising:

means of analyzing the segmentation, for a resolution level under consideration, in order to classify the regions in accordance with a predetermined criterion, means of decoding the coding data of the sub-bands of the resolution level under consideration as a function of the result of said analyzing step, means of reconstructing the sub-bands, and means of synthesizing the reconstructed sub-bands.

35. The decoding device according to claim 34, in which said the means of analysis, decoding, reconstruction and synthesis are incorporated in:

a microprocessor, a read only memory containing a program for decoding the data, and a random access memory containing registers adapted to record variables modified during the running of said program.

36. A digital signal processing apparatus comprising means adapted to implement said coding method according to any one of claims 1–3, 7, or 8.

37. A digital signal processing apparatus comprising means adapted to implement said decoding method according to claim 16.

38. A digital signal processing apparatus including said coding device according to any one of claims 17–19, 24, or 25.

39. A digital signal processing apparatus, including said decoding device according to claim 34.

40. A storage medium storing a program for implementing a method according to any one of claims 1–3, 7, or 8.

41. A storage medium according to claim 40, in which said storage medium comprises a floppy disk or a CD-ROM.

* * * * *

UNITED STATES PATENT AND TRADEMARK OFFICE
CERTIFICATE OF CORRECTION

| | | |
|---|---|---|
| PATENT NO. | : 6,711,298 B1 | |
| APPLICATION NO. | : 09/593695 | |
| DATED | : March 23, 2004 | |
| INVENTOR(S) | : Isabelle Amonou | |

It is certified that error appears in the above-identified patent and that said Letters Patent is hereby corrected as shown below:

ON THE TITLE PAGE (56) References Cited

OTHER PUBLICATIONS, "WO 97 15145   4/1997" and "WO 97 16030 5/1997"
should be deleted;
OTHER PUBLICATIONS, "G. Calvagno et al.," ($2^{nd}$ occurrence) should be deleted;
OTHER PUBLICATIONS, "J. Casas et al.," ($2^{nd}$ occurrence) should be deleted; and
OTHER PUBLICATIONS, "K. Oehler," should be deleted.

COLUMN 1

Line 56, "comprises" should read --comprise--.

COLUMN 9

Line 41, "a" ($2^{nd}$ occurrence) should read --an--; and
Line 56, "a" should read --an--.

COLUMN 11

Line 58, "bad" ($1^{st}$ occurrence) should read --bad.--

COLUMN 12

Line 23, "consideration" should read --consideration.--.

COLUMN 18

Line 32, "analogue" should read --analog--;
Line 33, "analogue" should read --analog--; and
Line 34, "analogue" should read --analog--.

UNITED STATES PATENT AND TRADEMARK OFFICE
CERTIFICATE OF CORRECTION

PATENT NO. : 6,711,298 B1
APPLICATION NO. : 09/593695
DATED : March 23, 2004
INVENTOR(S) : Isabelle Amonou It is certified that error appears in the above-identified patent and that said Letters Patent is hereby corrected as shown below:

COLUMN 19

Line 22, "for synthesise" should read --synthesizing--;
Line 25, "were" should read --was--; and
Line 26, "synthesis this" should read --synthesis. This--.

COLUMN 22

Line 60, "The" should read --The method--.

COLUMN 25

Line 10, "the" should be deleted.

Signed and Sealed this

Twenty-ninth Day of July, 2008

JON W. DUDAS
*Director of the United States Patent and Trademark Office*